United States Patent
Schneiderman et al.

(10) Patent No.: US 8,346,569 B2
(45) Date of Patent: Jan. 1, 2013

(54) SYSTEM AND METHOD FOR CREATING A DYNAMIC CUSTOMIZED EMPLOYMENT PROFILE AND SUBSEQUENT USE THEREOF

(75) Inventors: Jamie Schneiderman, Toronto (CA); Ben Baldwin, Toronto (CA)

(73) Assignee: Clearfit Inc., Toronto (CA)

( * ) Notice: Subject to any disclaimer, the term of this patent is extended or adjusted under 35 U.S.C. 154(b) by 502 days.

(21) Appl. No.: 12/400,569

(22) Filed: Mar. 9, 2009

(65) Prior Publication Data

US 2010/0153289 A1 Jun. 17, 2010

Related U.S. Application Data

(60) Provisional application No. 61/064,521, filed on Mar. 10, 2008.

(51) Int. Cl.
*G06Q 10/00* (2012.01)
(52) U.S. Cl. .................................. 705/1.1
(58) Field of Classification Search .............. None
See application file for complete search history.

(56) References Cited

U.S. PATENT DOCUMENTS

| | | | |
|---|---|---|---|
| 5,326,270 A * | 7/1994 | Ostby et al. | 434/362 |
| 5,551,880 A * | 9/1996 | Bonnstetter et al. | 434/236 |
| 5,978,768 A * | 11/1999 | McGovern et al. | 705/321 |
| 6,272,467 B1 * | 8/2001 | Durand et al. | 705/5 |
| 6,289,340 B1 * | 9/2001 | Puram et al. | 705/7.14 |
| 6,385,620 B1 * | 5/2002 | Kurzius et al. | 1/1 |
| 6,430,559 B1 * | 8/2002 | Zhai | 1/1 |
| 2004/0003566 A1 * | 1/2004 | Sicuranza | 52/518 |
| 2007/0143167 A1 * | 6/2007 | Cohen | 705/9 |

OTHER PUBLICATIONS

Blue Star selection report on Ms. Cindy Sample, Powered by CareerXact, Jul. 4, 2006.*

* cited by examiner

*Primary Examiner* — Jonathan Ouellette
(74) *Attorney, Agent, or Firm* — Occhiuti Rohlicek & Tsao LLP

(57) ABSTRACT

A system and method for dynamically generating a customized profile for a company for a selected profile type, the customized profile including a set of attribute types, each of the attribute types having a customized attribute range. The system comprises a receipt module for receiving a predefined profile having predefined attribute types corresponding to the set of attribute types. Each of the predefined attribute types has a predefined attribute range representing a range of attribute values for the selected profile type, and for receiving personal assessments of individuals related to the company. Each of the personal assessments has questions related to attributes. Each of the questions has a value assigned by the respective related individual.

25 Claims, 20 Drawing Sheets

How it Works

Step 1
Choose an Industry Standard JobFingerprint℠ of key personality & motivation attributes from proven top performers.

Step 2
Invite unlimited employees to fill-out a personality & motivation survey.

Step 3
Choose your best employees to customize your JobFingerprint based on their attributes.

Step 4
Add more criteria to your JobFingerprint (i.e. MBA, C++, fluent in Spanish, etc.).

Step 5
Build a custom Career Page for your candidates to view.

Step 6
Invite unlimited candidates to match against your JobFingerprint(s), using: (a) email or (b) job postings.

---

Review JobFingerprints, Candidates', and Employees' Results

| Your Candidates | Your Employees | Your JobFingerprints |
|---|---|---|
| • Match candidates against your JobFingerprints | • Generate a FREE Best Employees Report | • Generate JobFingerprint Reports |
| • Get candidates' PersonalFingerprint Reports | • Get Employee Development Reports | • Edit your JobFingerprints |
| • Invite more candidates | • Invite more employees | • Build more JobFingerprints |

Figure 4b

CAREERIOUS
PERSONALITY PREDICTS SUCCESS.

| HOME | EMPLOYERS | INDIVIDUALS | ABOUT US |

CHOOSE AN INDUSTRY STANDARD JOBFINGERPRINT

<INTRODUCTORY PARAGRAPH THAT EXPLAINS WHAT A JOBFINGERPRINT IS AND WHY THE EMPLOYER SHOULD BE INTERESTED INCREASING ONE ON ORDER TO HIRE CANDIDATES. A JOBFINGERPRINT INCLUDES SPECIFYING PERSONALITY & MOTIVATION TRAITS, AS WELL AS THE SKILLS AND EXPERIENCE REQUIRED FOR A SUCCESSFUL HIRE.>

CHOOSE AN INDUSTRY AND A JOB ROLE THAT IS AS SIMILAR AS POSSIBLE TO THE FOB YOU ARE HIRING FOR:

INDUSTRY: [SELECT INDUSTRY] ▼ = DESCRIPTION:
JOB TITLE: [SELECT A JOB FUNCTION] ▼ = <BRIEF JOB DESCRIPTION IS PRESENTED HERE ONCE THE USER HAS SELECTED BOTH AN INDUSTRY AND A JOB TITLE>

—144
—142

[CONTINUE>>]                                                           [<<BACK]

JOBFINGERPRINT

THE FOLLOWING IS AN INDUSTRY STANDARD JOBFINGERPRINT BASED ON THE JOB TITLE YOU SELECTED ABOVE. THE JOGINGERPRINT SHOWS THE ACCEPTABLE RANGES OF 21 DIFFERENT PERSONALITY TRAITS FOR THE CHOSEN JOB TITLE. WHEN YOU ADD POTENTIAL CANDIDATES, THEY WILL BE PLOTTED ON EACH AXIS OF THIS GRAPH SO YOU CAN EASILY SEE HOW THEY RATE AGAINST YOUR BENCHMARK. THE JOBFINGERPRINT CAN BE CUSTOMIZED BY INVITING YOUR EXISTING EMPLOYEES TO FILL IN A SHORT QUESTIONNAIRE. THEIR ANSWERS ARE USED TO TAILOR THE JOBFINGERPRINT. TRAITS IN DARKER BLUE REPRESENT THE MOST IMPORTANT ATTRIBUTES WHEN MATCHING A CANDIDATE TO A JOB. YOUR IDEAL CANDIDATE WILL BE CLOSE TO THE CENTER ON MOST OF THESE DARK BLUE TRAITS

HINT: YOU CAN ROLL OVER THE TITLE OF EACH OF THE TRAITS BELOW TO GET A BETTER DESCRIPTION OF THE ATTRIBUTE.

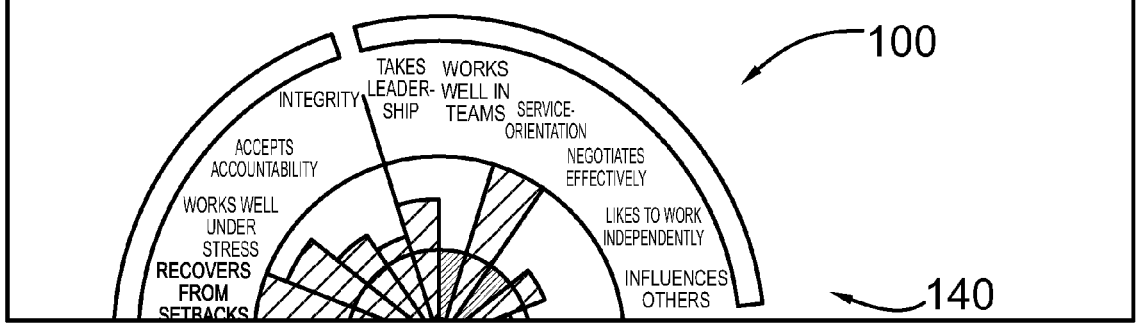

MATRIX 1: TRANSLATION OF PSYCHOLOGICAL ATTRIBUTES 151 (PERSONALITY) INTO WORKER ATTRIBUTES 150

| Worker Attribute 150 | Core Psychological Attribute 151 | | | | | | | | | | | | | | | |
|---|---|---|---|---|---|---|---|---|---|---|---|---|---|---|---|---|
| | 1 Resilient | 2 Assertive | 3 Dependable | 4 Affiliative | 5 Tolerates Ambiguity | 6 Cooperative | 7 Independent | 8 Achievement-Orientation | 9 Detail-Orientation | 10 Optimistic | 11 Self-Regulated | 12 Adaptable | 13 Stimulation / Risk Seeking | 14 Conventional | 15 Creative | 16 Socially Desirable Responding |
| 1. Stress Tolerance | .50 | | | | .25 | | | | | | .25 | | | | | |
| 2. Learning and Problem Solving | | | | | | | | .40 | | | | .60 | | | | |
| 3. Innovativeness | | .40 | | | | | | | | | | | .25 | -.25 | .50 | |
| 4. Takes Leadership | | | | | | | | .30 | | | .30 | | | | | |
| 5. Reliability / Consistency | .25 | | .50 | | | | | | | | .25 | | | | | |
| 6. Openness to Change / Ambiguity | | | | | .60 | | | | | | | .40 | | | | |
| 7. Team Orientation | | | | .30 | | .40 | | | | | | | | | | |
| 8. Independence | | | | | | | .60 | .40 | .50 | | | | | | | |
| 9. Drive | | .25 | | | | | | .50 | | | .60 | | .25 | | | |
| 10. Organization | | | .50 | | | | | | .50 | | | | | | | |
| 11. Accountability | | | .40 | | | | | | | | .25 | | | | | |
| 12. Recovery from Setbacks | .25 | | | | | | | .25 | | .50 | .25 | | .50 | | | |
| 13. Risk Tolerance | | | | | | | | | | | | | | -.25 | | |
| 14. Preference for Structure | | | .25 | | -.20 | .25 | -.20 | | | | .50 | -.20 | | .40 | | |
| 15. Conscientiousness | | | | | | .25 | | | | | | | | | | |
| 16. Service-Orientation | .25 | | .25 | | | | | | | .25 | | | | | | |
| 17. Influencing Others | | .20 | | | | | | .20 | | .20 | | .20 | .20 | | | |
| # Links | 5 | 3 | 5 | 1 | 3 | 3 | 2 | 7 | 1 | 3 | 7 | 5 | 4 | 3 | 1 | |

*For example, for a particular candidate, his/her score for Stress Tolerance is computed as
Stress Tolerance score = [.50 x (Resilience Score)] + [.25 x (Tolerates Ambiguity score)] + .25 x (Self-Regulated score)]

Figure 15

"Look Up" Table for Determining w(BE)

| Average Correlation (Step 411a) | w(BE) | W(Bench) = 1.00 – W(BE) |
|---|---|---|
| .00 - .10 | .20 | .80 |
| .11 - .15 | .25 | .75 |
| .16 - .20 | .30 | .70 |
| .21 - .25 | .35 | .65 |
| .26 - .30 | .45 | .55 |
| .31 - .35 | .55 | .45 |
| .36 - .40 | .65 | .35 |
| .41 - .45 | .75 | .25 |
| .46 - .50 | .85 | .15 |
| .51 - .55 | .90 | .10 |
| .56 - .60 | .95 | .05 |
| .61 - 1.00 | 1.00 | .00 |

Figure 16

SYSTEM AND METHOD FOR CREATING A DYNAMIC CUSTOMIZED EMPLOYMENT PROFILE AND SUBSEQUENT USE THEREOF

CROSS-REFERENCE TO RELATED APPLICATION PARAGRAPH

This application claims the benefit of U.S. Provisional Application No. 61/064,521 filed on Mar. 10, 2008, the content of which is hereby incorporated by reference in its entirety.

FIELD

This invention relates to generation of profiles and use of profiles to assess individuals such as employment candidates or employees.

BACKGROUND

In today's world, the process of evaluating employment candidates and employees for a company can be a daunting exercise that can include a thorough manual investigation of all candidate resumes received, which is considered inefficient and inaccurate. It is recognised that effective employee selection and subsequent employee hiring are key elements related to employee retention and reduction of employee turnover. In addition, it is recognised that there is a need for monitoring company culture and providing updated reassessment and employee benchmarking in situations where the cultural rate of change inside an organization is significant, which can be done during annual employee reviews. It can be important for a company to customize around their own employees because each company and corresponding culture can be different. Accordingly, the ability to benchmark accurately and to have an ability to dynamically change benchmarking standards for a company can be key to performance of the company in their market niche.

Companies also recognize that company culture is perpetuated based on the employee make-up of the company. In areas where company culture is identified as deviating from a desired standard, companies tend to seek out and hire leadership individuals with perceived beneficial traits to help get their company culture back on the right track, e.g. increasing devaluation of a company's stock in light of a perceived high performance, innovation driven culture of the company which indicates a change in leadership may be necessary. However, in view of ever increasing fluctuation in employee loyalty behaviours to their employers, the current makeup of company employees may be incompatible or otherwise out of sync, at least partly, with the perceived beneficial traits of the newly hired person (e.g. people in management) Therefore, it is even more important in today's business to know what the overall character of a company's employee makeup is through benchmarking, in order to help recognize any dynamic evolutions in employee character and ability.

Currently, employers use personality assessments to help improve accuracy, but the process of customizing their personality assessment to their job is still considered inefficient. Employers (in particular small businesses) require an inexpensive, easy-to-use, self-serve methodology for customizing their online personality assessment to their own unique job. In particular, the process of customizing the assessment using an organization's own employees (benchmarking) can be particularly cumbersome. In terms of larger businesses, the ability to have an efficient benchmarking process that can be dynamically created and revised to correspond to the ever changing employment needs of the company, is desired.

Unfortunately, existing candidate and employee review processes have a heavy manual component both from company staff and their opinion, plus involvement of an employment consultant and their "expertise" in trying to create a benchmark for the company's job posting, based on a manual analysis of a plurality of employment traits for selected company employees. The consultants take all the employee data and use their best judgment to create the ideal benchmark for the company employment position (i.e. job posting) to be advertised. Each benchmark varies both by the data inputs as well as through the individuals (from the company and/or hired consultants) making the decision/influencing the process. One disadvantage of the current benchmarking processes is that they can be only suited to companies with a large, relatively static number of employees from which to help create the benchmark. Further, the creation of benchmarks can involve an inefficient use of company resources, which would be better spent in attending to daily affairs of the company.

Further, current hiring practices using benchmarks can be inefficient, requiring the review of a large number of candidate resumes that match the benchmark, as well as associated interview time.

SUMMARY

Accordingly, it is recognised that current customization methodologies for benchmark creation are not practical self-serve, involve a cumbersome process and often require manual intervention from an expert in the field.

It is an object of the present invention to provide a profile customization environment to obviate or mitigate at least some of the above-presented disadvantages.

Currently, employers use personality assessments to help improve accuracy, but the process of customizing their personality assessment to their job is still considered inefficient. Employers (in particular small businesses) require an inexpensive, easy-to-use, self-serve methodology for customizing their online personality assessment to their own unique job. In particular, the process of customizing the assessment using an organization's own employees (benchmarking) can be particularly cumbersome. In terms of larger businesses, the ability to have an efficient benchmarking process that can be dynamically created and revised to correspond to the ever changing employment needs of the company, is desired. Contrary to current benchmarking system, there is provided a system and method for A system for dynamically generating a customized profile for a company for a selected profile type, the customized profile including a set of attribute types, each of the attribute types having a customized attribute range. The system comprises a receipt module adapted for receiving a predefined profile corresponding to the selected profile type, the predefined profile having predefined attribute types corresponding to the set of attribute types, each of the predefined attribute types having a predefined attribute range representing a range of attribute values for the selected profile type, and adapted for receiving a plurality of personal assessments of individuals related to the company, each of the personal assessments having questions related to one or more attributes of the set of attribute types, each of the questions having a value assigned by the respective related individual. The system also comprises a profile module adapted for calculating determined attribute ranges for each of the attribute types of the set of attribute types based on the values of the questions, and adapted for generating customized attribute ranges as a combination of the determined attribute ranges with the predefined attribute ranges. The system also comprises an output module adapted for storing the generated customized ranges as the customized profile.

An aspect provided is a system for dynamically generating a customized profile for a company for a selected profile type, the customized profile including a set of attribute types, each of the attribute types having a customized attribute range, the system comprising: a receipt module adapted for receiving a predefined profile corresponding to the selected profile type, the predefined profile having predefined attribute types corresponding to the set of attribute types, each of the predefined attribute types having a predefined attribute range representing a range of attribute values for the selected profile type, and adapted for receiving a plurality of personal assessments of individuals related to the company, each of the personal assessments having questions related to one or more attributes of the set of attribute types, each of the questions having a value assigned by the respective related individual; a profile module adapted for calculating determined attribute ranges for each of the attribute types of the set of attribute types based on the values of the questions, and adapted for generating customized attribute ranges as a combination of the determined attribute ranges with the predefined attribute ranges; and an output module adapted for storing the generated customized ranges as the customized profile.

A further aspect provided is where the combination is a weighted combination of the determined attribute ranges and the predefined attribute ranges, and can be based on a number of related individuals of the company represented in the plurality of personal assessments, such that the profile uses the actual number of related individuals represented in the plurality of personal assessments or a reduced or otherwise revised number of related individuals based on comparison of the number of related individuals to a determined inclusion number threshold.

A further aspect provided is the profile module adapted for selecting personal assessments corresponding to one or more of the related individuals and removing the corresponding attribute values from the combination, wherein the removal is based on the selected one or more related individuals considered as outside of a representative inclusion value of the determined attribute ranges.

A still further aspect is an aggregator module adapted for combining two or more of the plurality of customized profiles to generate an aggregated customized profile, wherein the aggregator module is adapted for comparing at least one of a plurality of aggregated customized profiles with one another or a selected customized profile with one or more aggregated profiles, the comparison for identifying a dynamic shift in time in general company staff values associated with the personal assessments.

A still further aspect is a method for dynamically generating a customized profile for a company for a selected profile type, the customized profile including a set of attribute types, each of the attribute types having a customized attribute range, the method comprising instructions stored on a memory and executable by a computer processor, the instructions comprising: receiving a predefined profile corresponding to the selected profile type, the predefined profile having predefined attribute types corresponding to the set of attribute types, each of the predefined attribute types having a predefined attribute range representing a range of attribute values for the selected profile type; receiving a plurality of personal assessments of individuals related to the company, each of the personal assessments having questions related to one or more attributes of the set of attribute types, each of the questions having a value assigned by the respective related individual; calculating determined attribute ranges for each of the attribute types of the set of attribute types based on the values of the questions; generating customized attribute ranges as a combination of the determined attribute ranges with the predefined attribute ranges; and storing the generated customized ranges as the customized profile.

BRIEF DESCRIPTION OF THE DRAWINGS

Exemplary embodiments of the invention will now be described in conjunction with the following drawings, by way of example only, in which:

FIG. 4b is a further embodiment of the general operation of FIG. 4a;

FIG. 7 is an example user interface as a Web page supplied by the framework of FIG. 1;

FIG. 15 shows a list of example psychological attributes of the system of FIG. 1;

FIG. 16 shows an example Look Up Table for Determining w(BE); and

DETAILED DESCRIPTION OF THE PREFERRED EMBODIMENT(S)

It is recognised in the following description, it may be advantageous to set forth definitions of certain words and phrases used throughout this patent document, such as: the terms "include" and "comprise," as well as derivatives thereof, mean inclusion without limitation; the term "or," can be inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" "engine" or "module" or "processor" means any device, system or part thereof that controls at least one operation, such a device may be implemented in hardware, firmware or software, or some combination of at least two of the same. It should be noted that the functionality associated with any particular "controller" "engine" or "module" or "processor" may be centralized or distributed, whether locally or remotely in the environment 10. Definitions for certain words and phrases are provided throughout this patent document, those of ordinary skill in the art should understand that in many, if not most instances, such definitions apply to prior, as well as future uses of such defined words and phrases.

Employment Determination Environment 10

Figure 1:
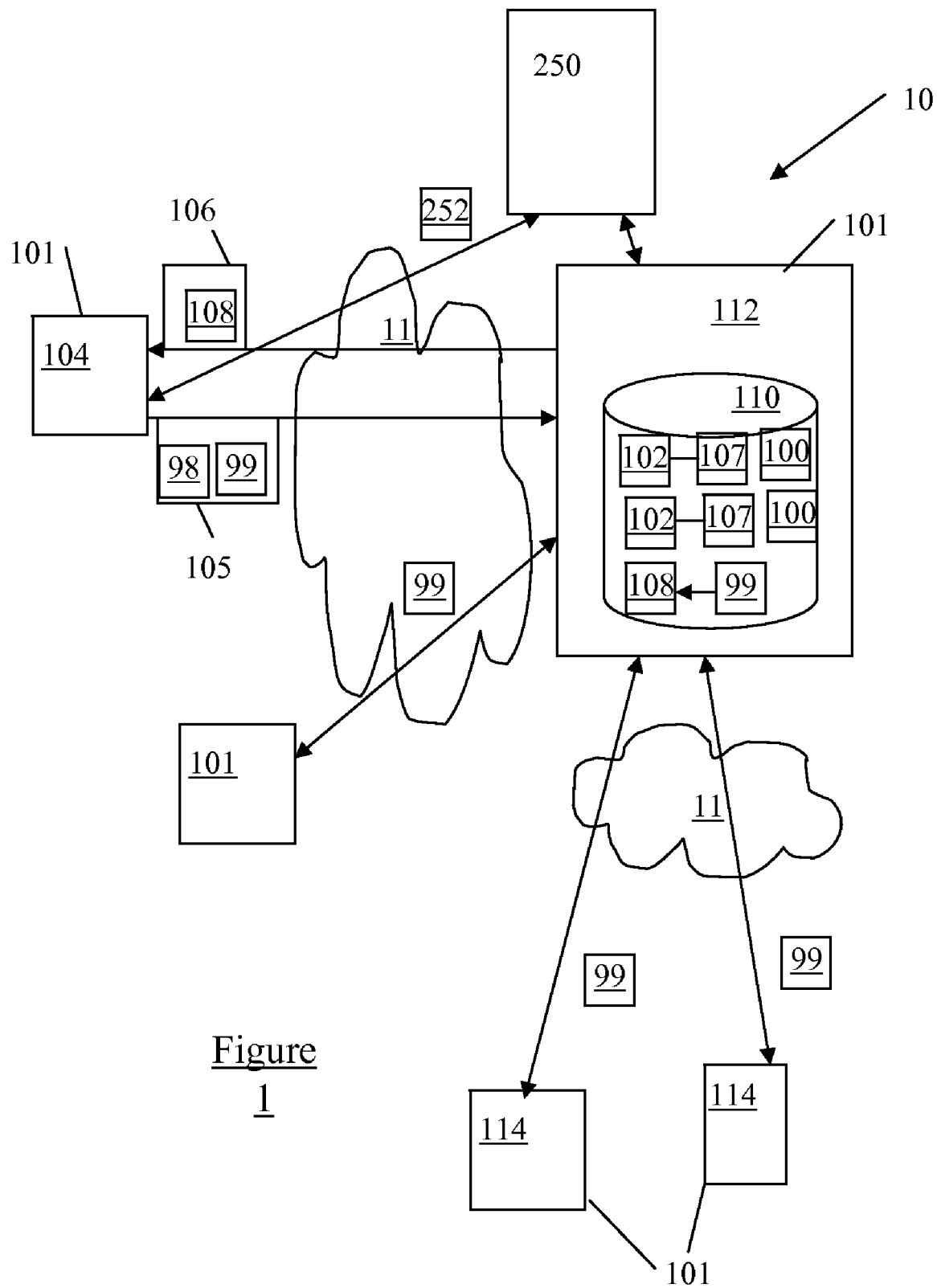
FIG. 1 is a block diagram of components of an employment profile generation and matching environment.
Figure 2A:
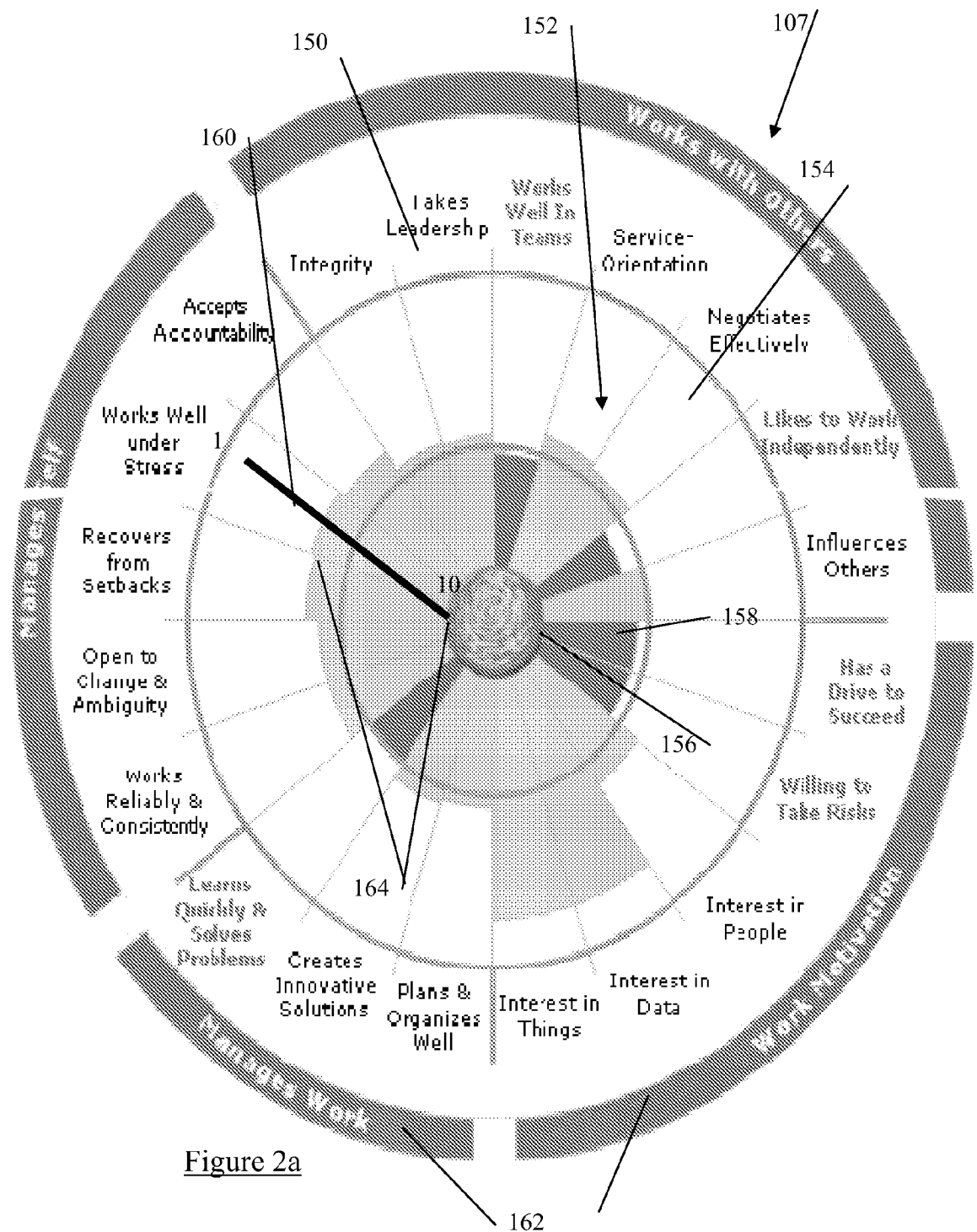
FIG. 2a shows an example customized employment profile/benchmark of the environment of FIG. 1.
Figure 2B:
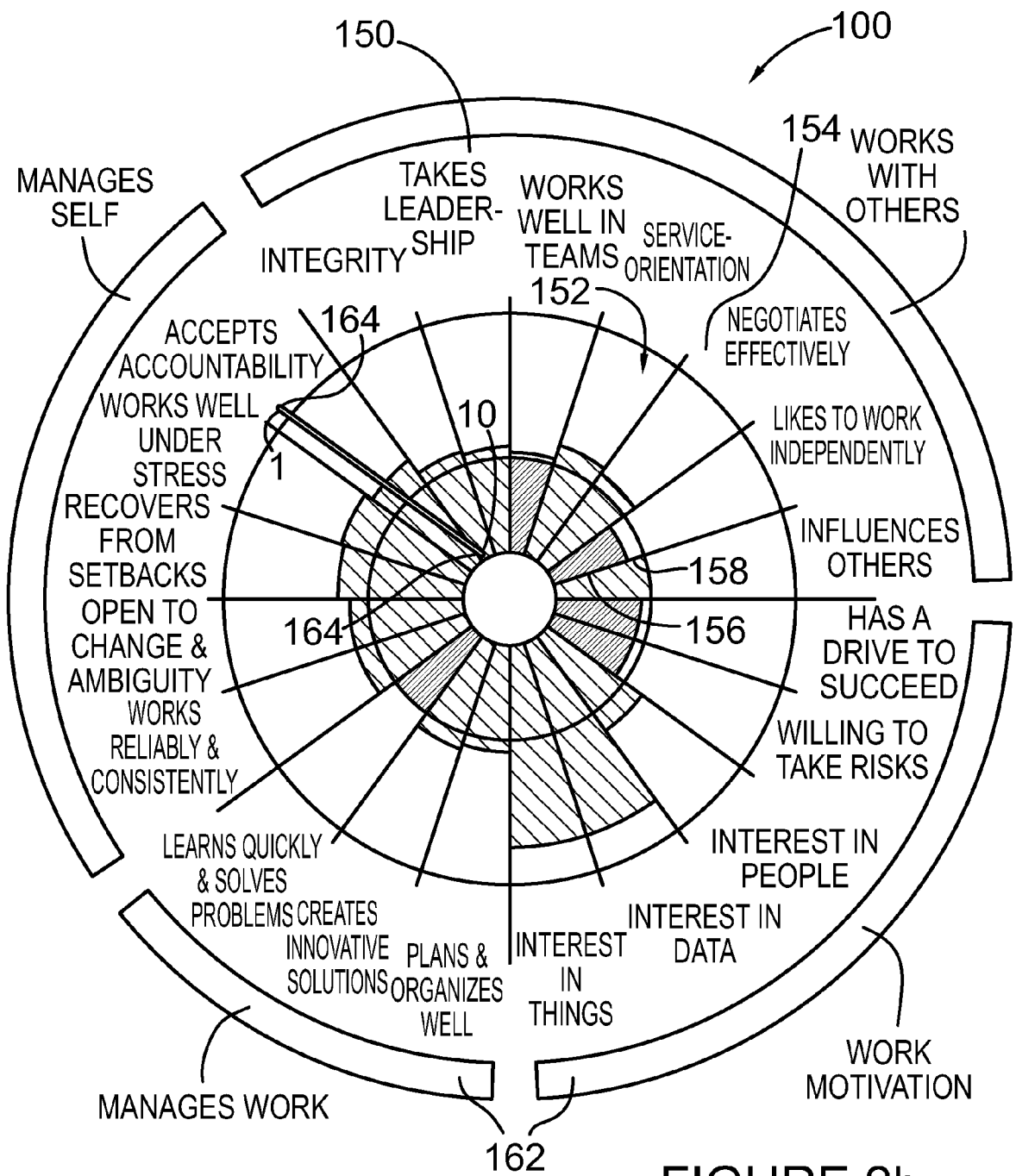
FIG. 2b shows an example standard employment profile/benchmark of the environment of FIG. 1.

Referring to FIG. 1, shown is an employment determination environment 10 for generating a plurality of customized profiles 107 (e.g. job/position/company/department benchmarks—see FIG. 2a) for companies 104, based on a selected predefined profile 100 (e.g. industry job/position/company/department benchmarks—see FIG. 2b) and employee information 105 that contains answers to personal assessments 99 completed by employees of the respective companies 104. For example, it is recognised that the predefined profile 100 can be based on industry wide employee profile(s). Further, the customized profiles 107 for a company 104 are a result of selected personal assessment 99 results and can include other employment definition information 98 (e.g. desired work experience, academic qualifications, etc) contained in the employee information 105 submitted by the company 104, combined with one or more predefined profile(s) 100, as implemented on a customization engine 250, for example as separate from the framework 112 or as integrated with the framework 112, as further described below.

The employee information 105 of the companies 104 includes answers to a plurality of questions contained in the assessments 99 and can include other employment definition information 98 (e.g. desired work experience, academic qualifications, etc). It is recognised that the employee information 105 can be supplied by the company to an employment framework 112 that helps to generate the employment profiles 107, the employee information 105 can be supplied directly by the company employees (e.g. via a network device 101 coupled to the framework via a network 11 to the employment definition framework 112, or a combination thereof. Also included in the framework 112 (i.e. stored in a database 110) are employment definitions 102 (e.g. job/position postings) that are published for access by a plurality of employment candidates 114, as further described below. It is recognised that the employment definitions 102 can be associated with a corresponding one of the employment profiles 107, as further described below.

Referring again to FIGS. 1 and 2c, once the customized profiles 107 for the company 104 are generated by the customization engine 250, a plurality of employment candidates 114 can communicate with the framework 112 over a network 11, in order to complete respective candidate assessments 99 and can include other employment definition information 98 for use in determining a respective candidate profile 108. It is recognised that the candidate profile 108 can optionally include other employment definition information 98 (e.g. desired work experience, academic qualifications, etc). The completed candidate profile 108 (e.g. as generated by the framework 112) can be used by the candidate 114 in applying for selected employment definitions 102 (e.g. including the customized profile 107 generated by the customization engine 250 on behalf of the company 104) as posted by the company 104 on the framework 112, for access by the potential job candidates 114. The generated candidate profile 108 can be based on the customized employment profile 107 that is associated with the employment definition 102, as selected by the candidate 114 from a list of posted employment definitions 102, or as a result of an invitation by the company 104 (or other entity, e.g. recruitment agency—not shown) to complete as part of job application to the employer 104. It is also recognised that the candidate profile 108 can be based on the candidate's 114 general traits alone, in addition to their comparison with the customized employment profile 107 for fit.

Communications between the company 104, the framework 112, and the candidates 114 are facilitated via one or more communication networks 11 (such as intranets and/or extranets—e.g. the Internet). The employment determination environment 10 can include multiple companies 104, one or more frameworks 112 (e.g. each framework directed to a specified geographical region), a plurality of candidates 114, and respective multiple hosting devices 101, as desired. Examples of the devices 101 are provided below (see FIG. 5).

Accordingly, in view of the above, it is recognised that the framework 112 and associated customization engine 250 facilitate a self-serve methodology for allowing companies 104 to customize their online personality assessments (e.g. customized profiles 107) that are directly related to their own unique job(s) of their company 104, based at least in part on one or more selected industry benchmarks 100 and employee data 99 and may or may not include other employment definition information 98 (e.g. desired work experience, academic qualifications, etc) collected from company employees that are considered as having employment/character traits that are related to the job(s) for which the customized profile 107 is generated. It is recognised that the customized profiles 107 can be defined for different profile types, such as but not limited to: a job type; a department type (e.g. collection of defined jobs specific to department within the company 104); and a company type (e.g. collection of defined jobs for the departments of the company 104). As further described below, the customized profiles 107 can be used to facilitate the use of customized profiles 107 for assessing different needs of an organization, including needs such as but not limited to; hiring of new staff; assessment/review of current staff; assessment/review of department or other employee groups over time (i.e. track changes in specific attributes 150 present in the customized profiles 107); etc.

Accordingly, it is recognised that the customization methodologies presented below, in view of the above environment 10, for benchmark customization can be viewed as self-serve for the companies 104, thereby inhibiting cumbersome benchmarking processes that often require manual intervention from an expert in the field. In addition, it is recognised that there is a need for updated reassessment and employee benchmarking in situations where the rate of change inside an organization 104 can be significant, which can be done during annual employee reviews, for example. Accordingly, the ability to produce customized profiles 107 (e.g. job benchmark) efficiently and to be able to dynamically change benchmarking standards for a company 104 can be beneficial to performance of the company 104 in their market niche. For example, the customized profile 107 can change as the company 104, via the customization engine 250, adds more employees for consideration (e.g. the customization engine 250 may choose to add or not to add the additional employees to the customized profile 107, as further described below. It is recognised that the content of the predefined profiles 100 can over time, for example as published by the framework 112.

It is also recognised that at least some of the customized profiles 107 may not be related to a particular employment definition 102, rather some of the profiles 107 may be representative of all employment positions at a company or a group of generic employment positions (e.g. management, sales, human resources, research positions, assistants, or other aggregations/combinations of selected customized profiles 107, as generated by the customization engine 250, see below). It is also recognised that the candidate profile 108 can also represent an employee profile, which indicates how they scored specifically in terms of the overall customized profile 107, as compared by the customization engine 250, further described below.

Assessment 99

The assessment 99, for use in generating the customized profiles 107 and/or the candidate profiles 108 has a plurality of questions for answering by the employee/candidate 114, for example as to the degree of agreement to the question (e.g. strongly agree, agree, disagree, strongly disagree). Each of the answers has a value attached to it, such that all of the answer scores are combined for each of the assessment 99 questions that are grouped into the same question category. Accordingly, each of the assessment 99 questions relate to one or more of predefined categories (e.g. psychological attributes 151—see FIG. 15). The combined question scores are converted (e.g. using a normative scoring curve, see "Example Raw Score Conversion Process" provided below as an example conversion method) to representative values of the predefined categories (e.g. psychological attributes 151). As further described below, the psychological attributes 151 are transformed into the attributes 150 present in the customized profile 107 (see FIG. 2*a*) included in the customized profile 107. It is also recognised that the attributes 150 could be the predefined categories of the assessment 99 questions, as desired. It is recognised that the profiles 107 may or may not be confidential with respect to the company 104.

Figure 6:
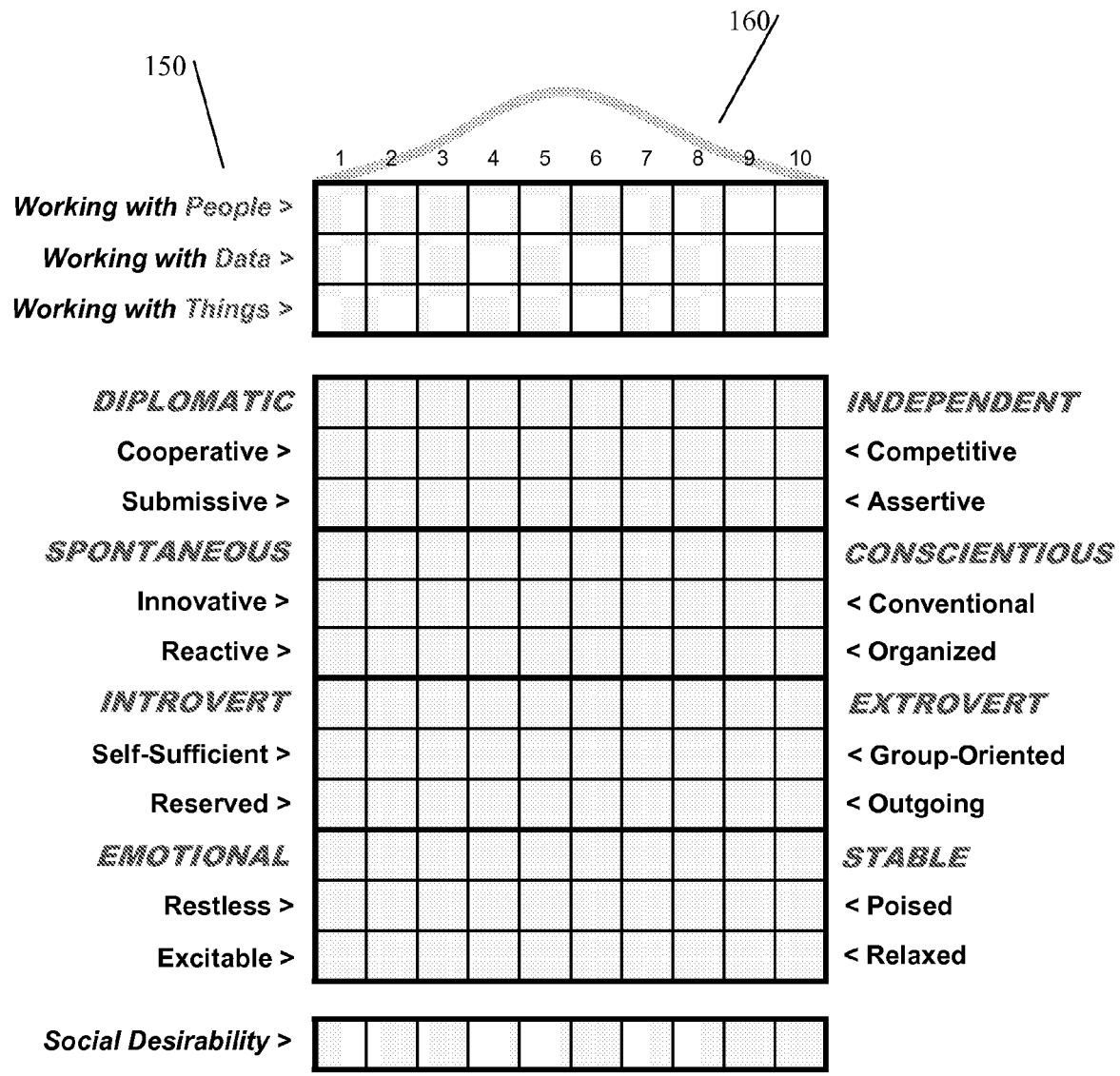
FIG. 6 shows example attributes with score scale for the attributes of the employment profiles of FIGS. 2 and 3.
Figure 8:
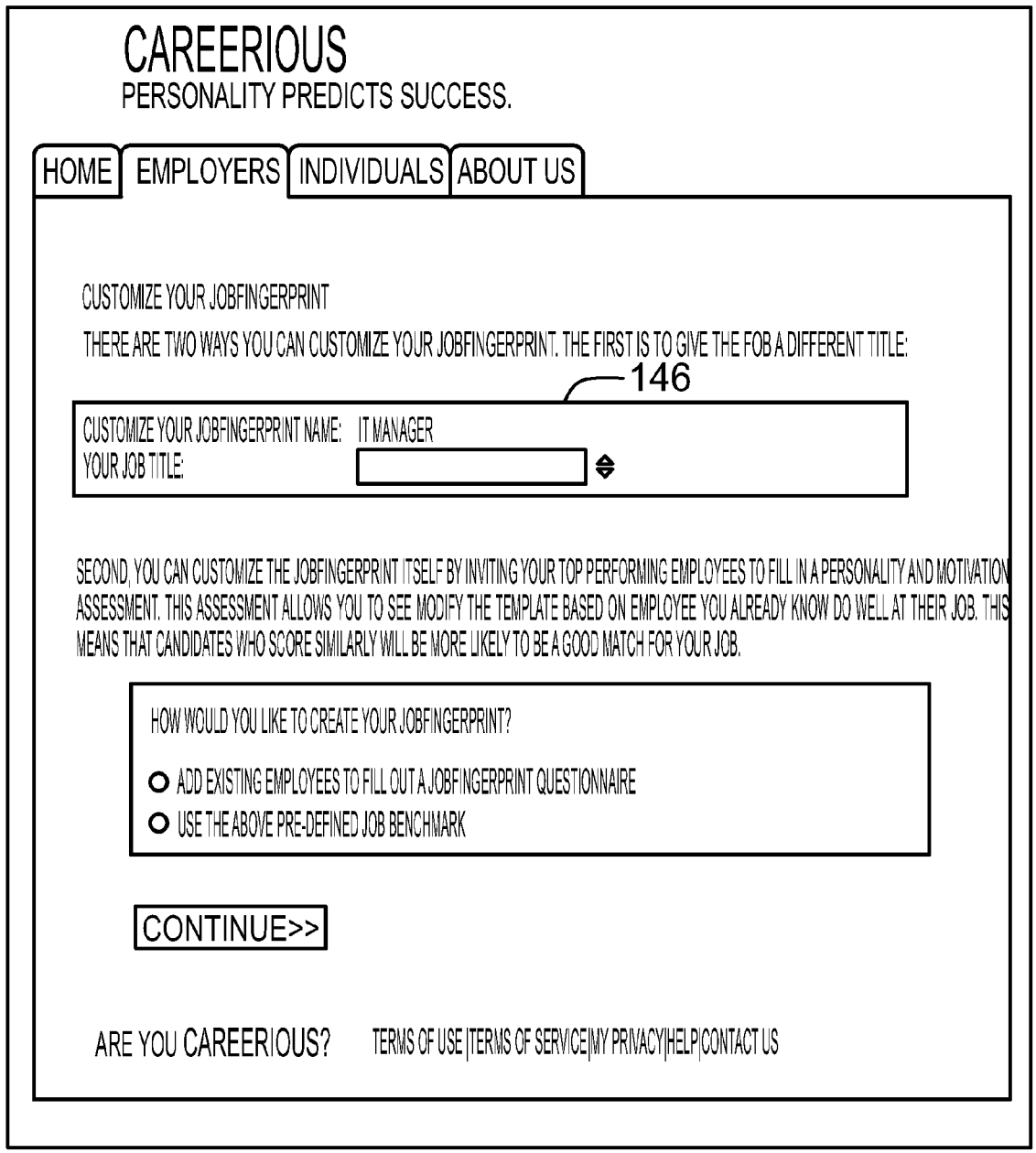
FIG. 8 is a further example user interface as a Web page supplied by the framework of FIG. 1.
Figure 9:
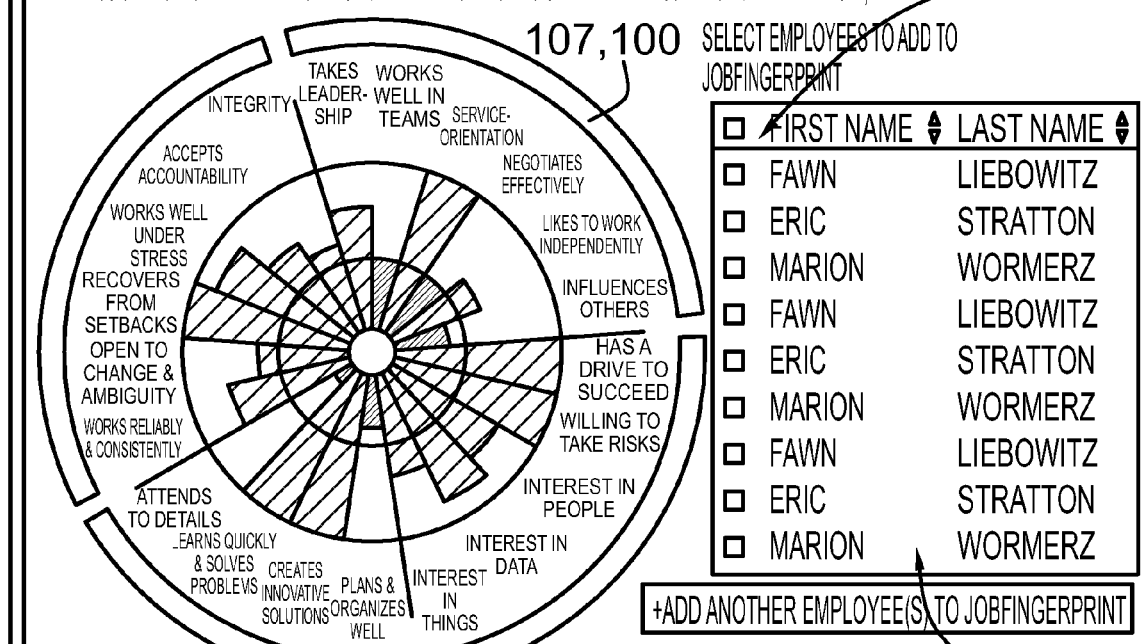
FIG. 9 is a further example user interface as a Web page supplied by the framework of FIG. 1.
Figure 10:
FIG. 10 is a further example user interface as a Web page supplied by the framework of FIG. 1.

Referring to FIG. 6, shown is an example set of attributes 150 and attribute scale 160 that is used to store the derived attribute results from the personal assessments 99 completed by the candidates 114 and company 104 employees. Each individual scores once across each horizontal line (i.e. attribute 150). For example, there can be 3 interest/motivation traits & 12 personality (e.g. worker attribute) attributes 150, with each of the attributes 150 having sub attributes 150. Opposing attributes 150 are extremes/opposites. Further, the social desirability attribute 150 can indicate the probability of intentional or unintentionally distorted/manipulated results in view of how the candidate/employee filled out the assessment 99.

It is recognised that for example, the scale 160 can represent a normative scale, such that the majority of individual's scores would fall between 4 and 7, such that scores 1 and 10 would be considered extreme scores.

Customization Profiles 107

Referring to FIG. 2*a*, shown is an example of the customized profiles 107 that has a series of employee attributes 150 that each has attribute data characteristics such as an overall range 152 for the attribute 150. The ranges 152 extend from a first boundary 154 (e.g. an outside circle) to a second boundary 156 (e.g. an inner circle), such that an identified/target portion 158 in each range 152 represents a region that a candidate's 114 score (for that attribute 150) should fall into, in order to be potentially considered for the job(s) 102 associated with the profile 107. For example, the outer boundary 154 can represent a lowest score (e.g. one) for the attributes 150 and the inner boundary 156 can represent the highest score (e.g. ten) for the attributes 150, according to an attribute scale 160 (e.g. 1-10) that is either displayed or is implicit to the profile 107. The attributes 150 can also be grouped into attribute categories 162, as desired. It is recognised that the profiles 107 can be based on shapes other than circular (e.g. square, rectangular, three-dimensional shapes, etc.), as desired.

Also, certain attributes 150 of the customized profile 107 can be indicated as important (e.g. a top number such as 5) that are more indicative (e.g. key) of attributes 150 that a candidate 114 should have, as an appropriate indicator of success in the job/group of jobs represented by the customized profile 107.

Predefined Profiles 100

The predefined profiles 100 contain what are believed/perceived to be the key personality and motivation traits of proven top performers in many industries for a selected employment position or group of positions (e.g. job title). For example, certain attributes 150 of the profile 100 can be indicated as important (e.g. a selected number such as 5) that are more indicative (e.g. key) of attributes 150 that a candidate 114 should have, as an appropriate indicator of success in the job/group of jobs represented by the profile 100 for the industry. It is recognised that the key personality and motivation traits of the standard profile 100 may be changed by the customization process of the engine 250, thus providing for key personality and motivation traits in the customized profile 107 that are different (e.g. more representative of the assessment data of the company 104 employees) from the standard profile 100 (i.e. the standard profile has key personality and motivation traits that are selected from assessments 99 done for employees from a plurality of companies 104 in the industry).

Referring to FIG. 2*b*, shown is an example of the standard profiles 100 that has a series of employee attributes 150 that each has attribute data characteristics such as has an overall range 152 for the attribute 150, as an average for the industry for that particular job or grouping of jobs represented by the standard profile 100. The ranges 152 extend from a first boundary 154 (e.g. an outside circle) to a second boundary 156 (e.g. an inner circle), such that an identified/target portion 158 in each range 152 represents a region that a candidate's 114 score (for that attribute 150) should fall into, in order to be potentially considered for the job(s) 102 associated with the customized profile 107. For example, the outer boundary 154 can represent a lowest score (e.g. one) for the attributes 150 and the inner boundary 156 can represent the highest score (e.g. ten) for the attributes 150, according to an attribute scale 160 (e.g. 1-10) that is either displayed or is implicit to the profile 107. The attributes 150 can also be grouped into attribute categories 162, as desired. It is recognised that the profiles 100 can be based on shapes other than circular (e.g. square, rectangular, three-dimensional shapes, etc.), as desired. It is recognised that the main components of the original profile 100 are similar to the customized profile 107, as the customized profile 107 is viewed as an amended version of the original profile 100, i.e. through the customization process implemented by the customization engine 250.

Candidate Profiles 108

As discussed above, the employment candidates 114 can communicate with the framework 112 over a network 11, in order to complete respective candidate assessments 99 and can include other employment definition information 98 for use in determining a respective candidate profile 108. The completed candidate profile 108 (e.g. as generated by the framework 112) can be used by the candidate 114 in applying for selected employment definitions 102 (e.g. including the customized profile 107 generated by the customization engine 250 on behalf of the company 104) as posted by the company 104 on the framework 112, for access by the potential job candidates 114.

Figure 2C:
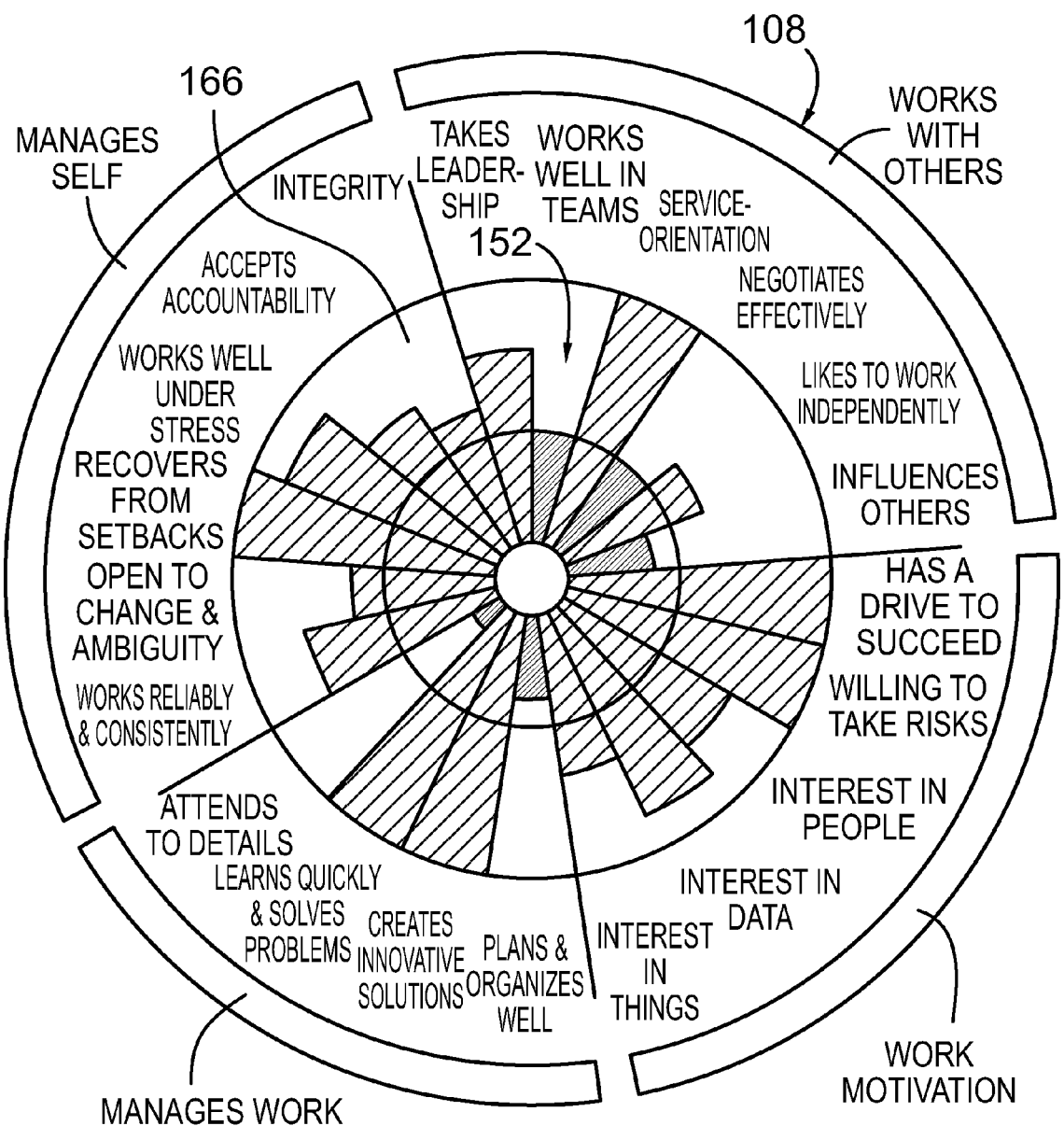
FIG. 2c shows an example individual candidate or employee employment profile scores based on the customized profile of FIG. 2b.

Referring to FIG. 2c, shown is an example of the candidate profiles 108 that has a series of employee attributes 150 that each has an overall range 152 for the attribute 150, as an average for the industry for that particular job or grouping of jobs represented by the standard profile 100. The ranges 152 extend from a first boundary 154 (e.g. an outside circle) to a second boundary 156 (e.g. an inner circle), such that an identified/target portion 158 in each range 152 represents the region that the candidate's 114 score 166 (for that attribute 150) should fall into, in order to be potentially considered for the job(s) 102 associated with the customized profile 107. For example, the outer boundary 154 can represent a lowest score (e.g. one) for the attributes 150 and the inner boundary 156 can represent the highest score (e.g. ten) for the attributes 150, according to an attribute scale 160 (e.g. 1-10) that is either displayed or is implicit to the profile 108. The attributes 150 can also be grouped into attribute categories 162, as desired. It is recognised that the profiles 108 can be based on shapes other than circular (e.g. square, rectangular, three-dimensional shapes, etc.), as desired. It is recognised that the main components of the candidate profile 108 are similar to the customized profile 107, as the candidate profile 108 is viewed as a version of the customized profile 107 specific to the candidate 114, i.e. through the candidate process implemented by the framework 112.

Overview of Customized Employment Profile 107 Generation

Referring to FIG. 1, the customization engine 250 facilitates a turnkey/self-serve environment 10 for generation of a customized profile 107 for a company 104, based on assessment information 99 of company 104 employees and a selected standard profile 100 (or profiles 100) by the company 104 from a profile 100 list provided by the framework 112. In terms of customizing, each employer 104 gets their own unique job profile 107, because each job profile 107 incorporates the scores of their own top performer employees (which are unique to only them, obviously), as well as potentially their underperformers as well (e.g. a customized undesirable profile 107 can be generated as a tool for use in weeding out undesirable employee candidates—where matches to the customized undesirable profile 107 would result in disqualification of the potential candidate 114 for any jobs at the company 104). Otherwise, it is recognised that a combination of both together, where both the high and low performers results can be explicitly represented in the customized profile 107 (e.g. desired attributes 150 and/or undesired attributes 150 can be included with corresponding ranges 152 in the profile 107.

In terms of balance, as implemented by the customization engine 250, each employer starts with a (i) a standard job profile 100, customizing it by (ii) adding the profiles (e.g. assessment information 99) of their own top or mid or bottom performers. The customization engine 250 can be configured to put more weight on the (i) standard job profile 100 if there are fewer (e.g. less that an minimum number employee threshold) top employees or less weight on the standard job profile 100 if there are several (e.g. greater than a minimum number employee threshold) top or mid or bottom employees.

For example, the number of employees considered by the customization engine 250 (as submitted by the company 104), can be a driver of the weighting (e.g. the number of submitted employees and their personal assessment data 99), when the number of submitted employees is measured against the minimum number employee threshold. Otherwise, or in addition to, the number of employees considered by the customization engine 250 can be different than the employee number submitted by the company 104. For example the customization engine 250 can reduce/filter the number of employees for consideration by removing (e.g. filtering out) employee assessments 99 (from use in determination of the attribute ranges 152 in the customized profile 107), which are determined to be outside (e.g. greater than or less that employee max/min inclusion thresholds) of a determined average (or other normative combination) range 152 for each of the attributes 150 (e.g. the determined employee attributes are extreme compared to the rest of the employee attributes 150 determined from the submitted assessment data 99). In this case, the resultant reduced or otherwise filtered number of employees can be the driver of weighting in calculation of the customized profile 107 by homogeneity of the employees, as further described below.

It is recognised that there can also be a number or thresholds, thereby facilitating a graduated weighting from the customized profile 107 being composed of attribute 150 data characteristics (ranges, etc.) mostly from the standard profile 100, to the customized profile 107 being composed of attribute 150 data characteristics (ranges, etc.) mostly from the employee assessments 99 information.

It is recognised that in situation where the company 104 has a large number of employees, the attribute 150 characteristics in the customized profile 107 would be based only on the employee assessment data 99 (e.g. the degree of homogeneity of employees can determine the weighting of their scores verses the predetermined profile 100 in creation of the customized profile 107), while in the situation at the other extreme where the company 104 has a small number of employees, the attribute 150 characteristics in the customized profile 107 would be based predominantly on the standard profile 100 attributes 150. However, even in the case where the company only has a single employee for providing assessment data 99 appropriate to the job(s) represented by the standard profile(s) 100, the customization engine 250 would still provide for a weighted combination of the attribute 150 data from the standard profile 100 and the attribute 150 data calculated from the employee assessment data 99.

Figure 4A:
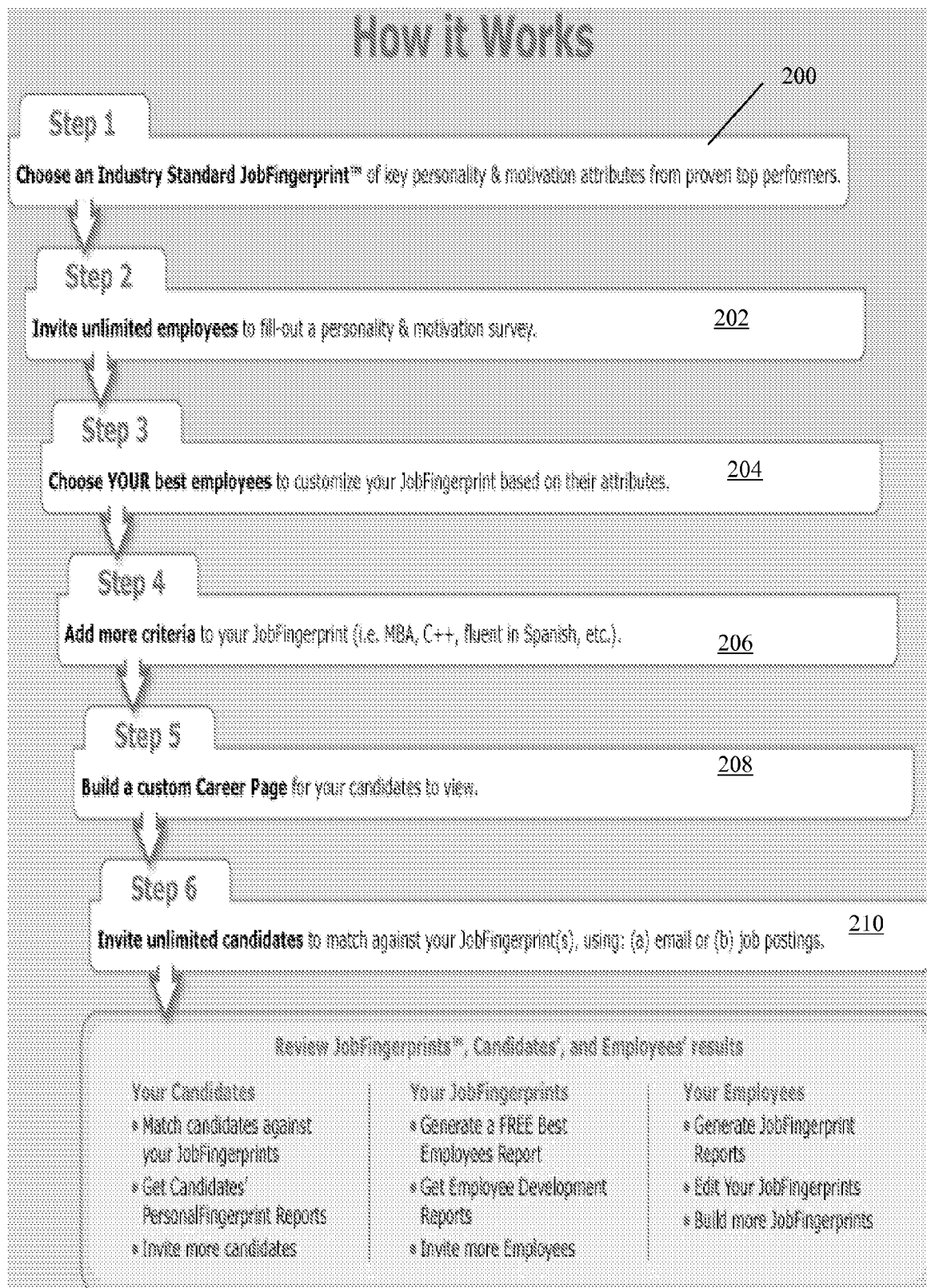
FIG. 4a is a flowchart of an example general operation of the framework of the environment of FIG. 1.

Referring to FIG. 4, the company 104 communicates with the framework 112 over the network 11 (e.g. via a Website of the framework 112 presented as a series of interactive Web pages 140—see FIGS. 7-10) in order to generate the customized employment profile 107 and any associated employment definition 102. For example, first an existing standard job profile 100 is selected 200 from a profile library (e.g. via a drop-down menu) 144, 142, which can be available in the database 110 for a plurality of different jobs 142 in different industries 144. When the standard job profile 100 is selected, a preview of it can appear below the drop down menu (see FIG. 7) on the user interface 302 of the company device 101 (see FIG. 5).

For example, the standard job profile 100 can appear similar to the profile 107 shown in FIG. 2b, prior to the addition of company employee scores as further described below. Referring again to FIG. 2b, the standard profiles 100 (and customized profiles 107 in FIG. 2a) can have the series of employee attributes 150 that each has the overall range 152 for each of the attributes 150. The ranges 152 extend from the first boundary 154 to the second boundary 156, such that the identified portion 158 in each range 152 represents the region that a candidate's 114 score (for that attribute 150) should fall into, in order to be potentially considered for the job(s) 102 associated with the profile 107, as further described below. Further, it is recognised that the name of the standard job profile 100 can be re-named (see FIG. 8) from the template name to any custom job name 146 the employer 104 prefers. Also envisioned is that the employer registers with the framework 112 to start an employer/company account within which to save their customized profile 107 and/or other company 104 information, such as employment definitions 102.

The next step is for the company 104 to invite 202 (see FIG. 4) to fill out the personal assessments 99 and may include other employee definition information 98 (either at the company 104 and/or via the Website of the framework 112). Once the assessments 99 and 98 are completed, the company 104 may or may not choose 204 which of the employee assessments 99 they wish to combine with the standard profile 100 to create the customized profile 107. For example, a list of employees 148 (see FIG. 9) they have assessed (assuming employer has already assessed several of their employees, using our assessment 99) can be presented/displayed to the company with check boxes (selection means checking their corresponding box, for example) 149 beside their names. In one example embodiment, the employer 104 can rate all employees and assign them for inclusion in calculation of a selected customized profile 107 (e.g. by selecting the associated predetermined profile 100 from a list provided by the framework 112), regardless of the employees indicated level of performance. The employer 104 can also include all employees for inclusion in the profile 107 calculation, through a single click on or off. Alternatively, the employer 104 can choose to not include an employee's results by not linking them for inclusion in the profile 107 calculation.

When a check box is checked, a few things happen: (a) that corresponding employee is "added" to the employers job profile 107, changing the blue target ranges 158 (see FIG. 2b) from those of the standard job profile 100 to include the selected employees' scores of the attributes 150 determined from their completed personal assessments 99, further described below. This customizes the profile 107 for each employer 104 because each employee's scores are considered unique from the employer 104 perspective; and (b) if more than one employee is checked, those 2+ employees' scores can both be added (if determined appropriate for inclusion by the customization engine 250) to the employer's job profile 107 and the target ranges 158 dimensions (e.g. upper and lower bounds 164 with respect to the scale 160) change to include those 2+ employees' scores. It is recognised that the upper and lower bounds 164 may or may not coincide (either one or both bounds) with the first 154 and second 156 boundaries of the ranges 152 of the attributes 150. Another example is where when the box is checked, it includes all the employees that are linked to that job.

In generation of the customized profile 107, the customization engine 250 can put more weight on the standard job profile 100 if there are fewer top employees (e.g. measured as actual number submitted/selected by the employer 104 and/or the reduced/filtered number determined by the customization engine 250) or less weight on the standard job profile 100 if there are several top employees, in terms of combining the attribute scores of the profile 100 with the attribute scores of the employees derived from their completed personal assessments 99. Once completed, the company 104 saves their final custom job profile 107 for subsequent use in comparing against any of the personal assessment attribute scores obtained from potential candidates 114 that are applying to the company 104 (either in general and/or for specific selected employment definitions 102). After saving, company 104 can resume this process later, further modifying their custom profile 107, as they choose to select new employees and remove old employees from the custom profile 107.

Further to the above, it is recognised that a possible driver of the weighting preformed by the profile module 258 is the homogeneity (i.e. relatedness of the employees to one another in terms of their analyses assessments 99)—regardless of the numbers. Outliers can get removed and then all the remaining employees are included in the calculation of the profile 107. The collective homogeneity of those remaining employees may or may not be very high and that can drive the weighting on standard profile 100 verses using employees' results 99. For example, a determined degree of homogeneity of the remaining employees (e.g. those not filtered out as outliers) can be used to determine the degree of weighting on the standard profile 100 verses using employees' results 99, in calculation of the profile 107. For example, for homogeneity below and/or above a specified relatedness threshold, a corresponding predefined weighting value of the standard profile 100 can be used to combine with the determined profile values (e.g. attribute values 150, ranges 152, etc based on the personal assessment data 99 used in the determination).

At step 206, the company 104 can add more criteria (e.g. employment definition information 98) to be associated with the employment definition 102 associated with the customized profile 107. The company 104 can also build 208 a customized Web page (e.g. including the employment profiles 102 and other company information) for access by the candidates 114.

In view of the above, it is recognised that in creation of the customized profile 107, the customization engine 250 and/or the company 104 can omit certain actions, such as but not limited to: manual intervention from the vendor (i.e. phone, email, web help); showing of individual employees' scores as they are just combined with the standard profile 100 without letting the employer 104 see how each of their invited employees scored on the personal assessments 99; and do not show a profile 107 to the employer 104 that's based only on the employees scores, as all job profiles 107 originate from the standard job profile 100 selected from the library.

It is recognised that the above-described generation of the customized profile 107 can be done using attribute scores (from the personal assessment 99) obtained from one or more employees. Once completed (e.g. the profile 107 and optionally the associated definition 102), the company 104 can invite 210 potential candidates 114 to apply for employment positions at the company 104, as coordinated by the framework 112. Also realized is that the company 104 can obtain individual candidate 114 profiles 108 (refer to FIG. 2c) that have the individual attribute scores 166 positioned on the attribute ranges 152, can get candidate profile reports (e.g. individual attribute scores 166 of the employee(s) positioned on the attribute ranges 152), can get employee profile reports, can generate profile 107 reports, and can further edit the profiles 107 and analyze the candidate and employee scores using other tools, as desired.

Accordingly, in view of the above, the profiles 107 are configured so as to facilitate the visual determination by the company 104 of target applicants (i.e. candidates 114) who fit the profile 107 (e.g. have attribute values 166 within the ranges 152 and 158), based in part on those company 104 employees that are selected by the company 104 as those who were top-rated over time. As can be seen, the candidate profiles 108 can be used to visually access how close is each applicant 114 is to the 'bull's eye' (e.g. upper boundary of 164, or 156) as well as how far an applicant 114 strays from the 'bull's eye'.

Further, it is recognised that the ability to produce customized profiles 107 (e.g. job benchmark) efficiently and to be able to dynamically change benchmarking standards for a company 104 can be beneficial to performance of the company 104 in their market niche, when using the generated customized profiles 107 to facilitate assessment of the company staffing, as further described below, including any trending in company staff profiles over time.

Customization Engine 250

Figure 3:
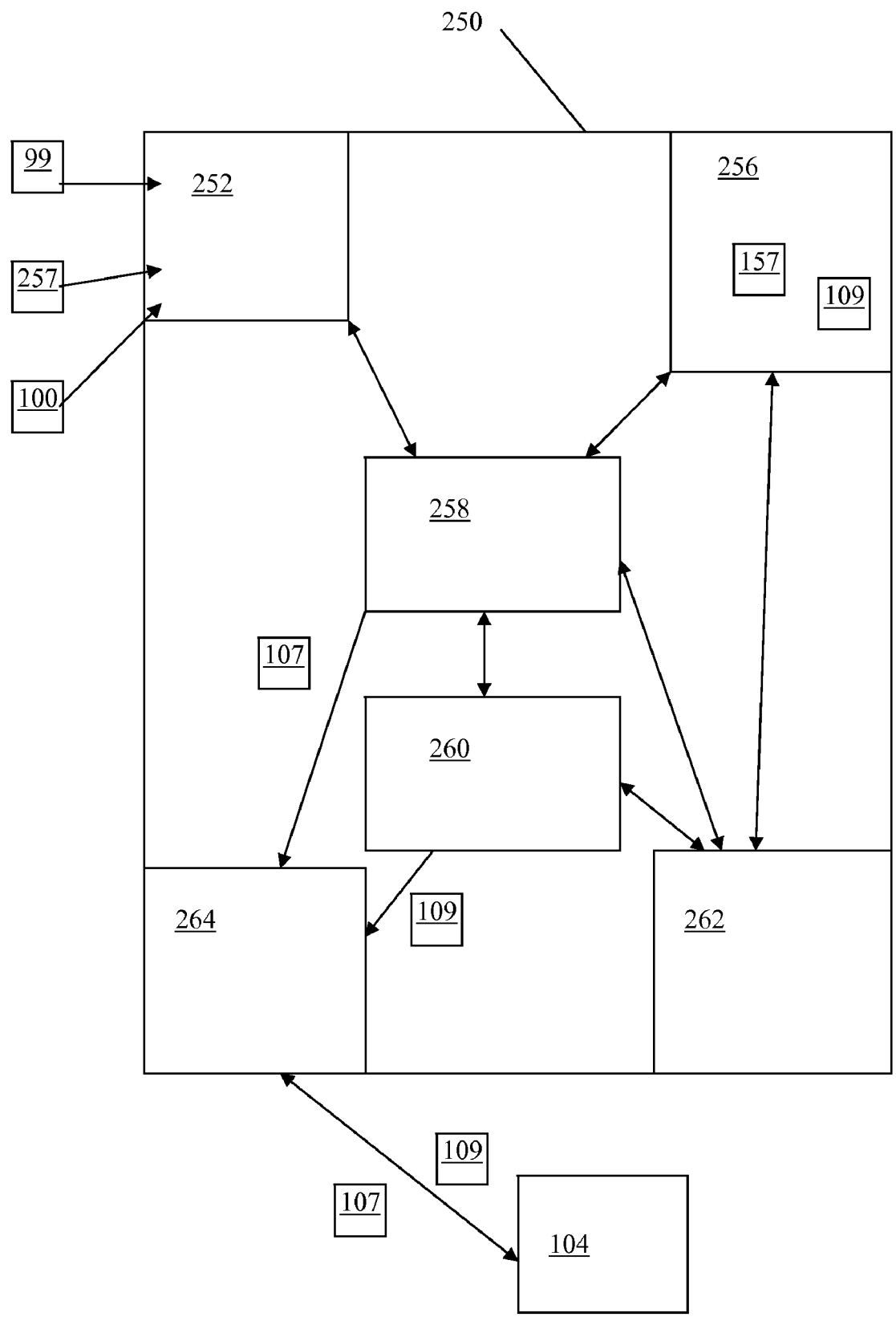
FIG. 3 shows an example block diagram of the customization engine of FIG. 1.

Referring to FIG. 3, shown is an example embodiment of the customization engine 250. The customized profiles 107 for a company 104 are a result of selected personal assessment 99 results contained in the employee information 105, as submitted by the company 104, combined with one or more predefined profile(s) 100, as implemented on the customization engine 250, for example as separate from the framework 112 or as integrated with the framework 112, as further described below.

The customization engine 250 has a receipt module 252 for receiving the standard profile(s) 100 selected by the company 104, any readjustment parameters 254 (e.g. specification of desired top attributes 150 in the resultant profile 107, including any desired ranges 152 thereof, as well as all assessment data 99 submitted by the company 99 (on behalf of the employees) and/or submitted directly by the employees. Further, it is recognised that the assessment data 99 can include indications 255 by the company concerning 1) specification of which employees should be included in the profile 107 calculation, 2) specification of which employees should be removed from the profile 107 calculation, 3) submission of performance rating results (e.g. top, mid, weak performer) as identified/specified by the company 104 for selected employees as compared to a simple manual selection (e.g. tick box) of the employees that should be included/excluded in the profile 107 calculation, and/or employee type (e.g. performer rating, employee status such as new, fired, resigned, indefinite/definite layoff, etc.), as desired.

The customization engine 250 also has a set of filter settings 256 (e.g. previously submitted/stored indications 255) for use in guiding the calculation of the customized profile 107 through the systematic inclusion and/or exclusion of specified employees that satisfy the indication(s) 255 conditions/definitions. The customization engine 250 also a profile module 258 for use in generation the customized profile 107 in view of any appropriate filter settings 256 in combination with any readjustment parameters 254, assessment data 99, and/or indications 255, and selected standard profile(s) 100, as further described below.

Further, the customization engine 250 can also have an aggregation module 260 for use in determining aggregated customized profiles 109 (i.e. a combination of assessment data 99 for different profiles 107 and/or directly from the collected customization profiles 107 themselves), for use in tracking or otherwise monitoring/comparing any dynamic shifts in general company staff culture/characteristics/attributes, as further described below. The customization engine 250 can also have a remove module 262 for tacking/maintaining a list of employees that are excluded from selected profiles 107 (e.g. as manually specified by the company 104 and/or for those employees failing to satisfy inclusion thresholds further described below). Further, the customization engine 250 also has an output module 264 for outputting the generated customized profile 107 for use/receipt by the company 104.

Profile Module 258

The profile module 258 is configured for generation of the customized profile 107, in view of any appropriate filter settings 256 in combination with any submitted readjustment parameters 254, assessment data 99, and/or indications 255, and selected standard profile(s) 100, as further described below.

Figure 11:
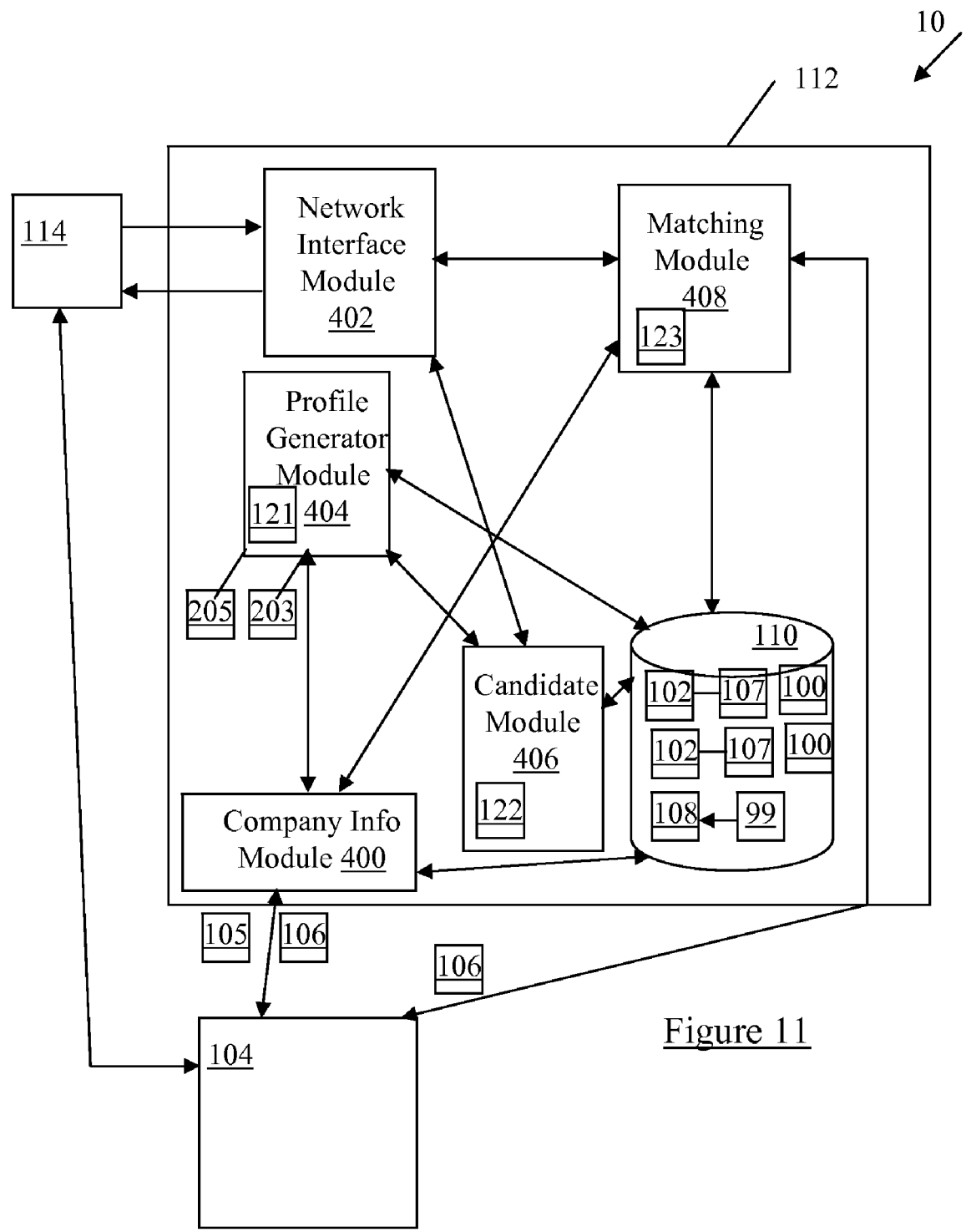
FIG. 11 is an example block configuration of the framework of the environment of FIG. 1.
Figure 12:
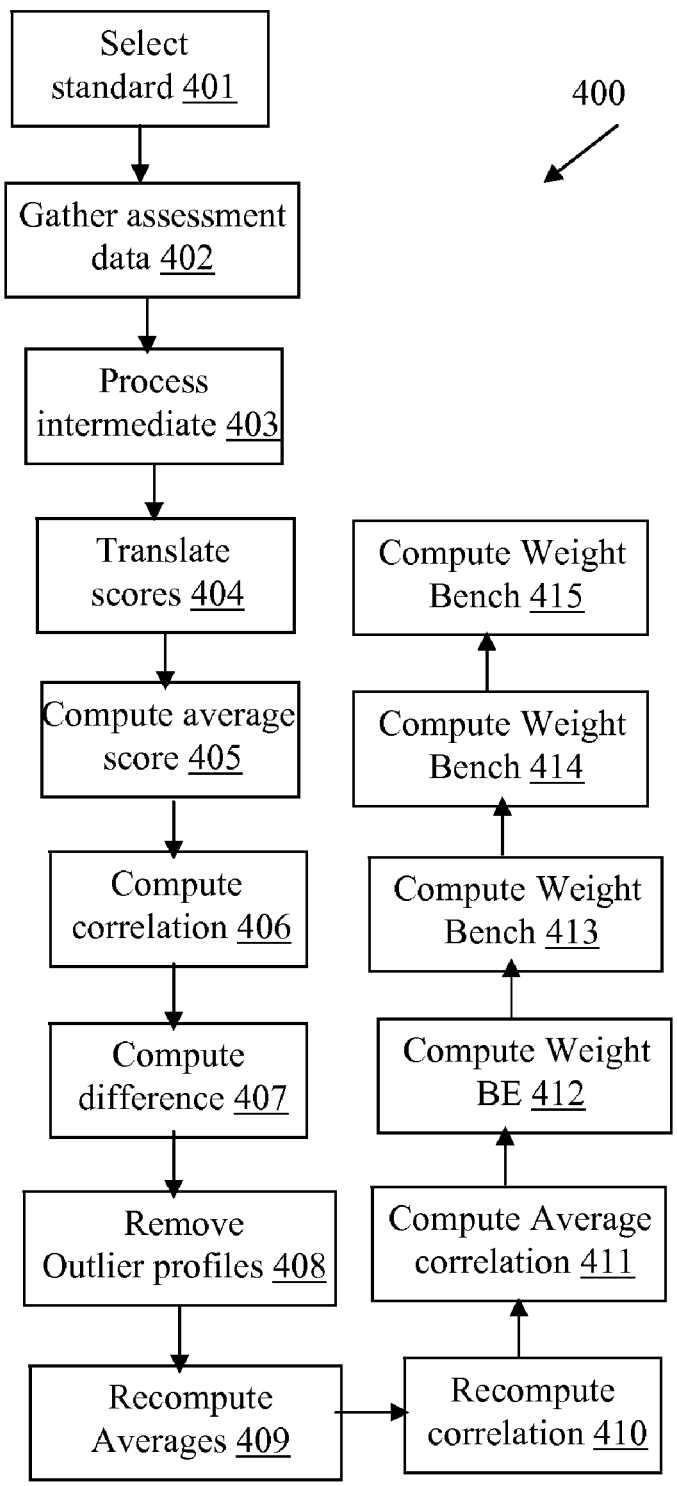
FIG. 12 is a flowchart of an example operation of the profile generator module of the framework of FIG. 11.
Figure 13:
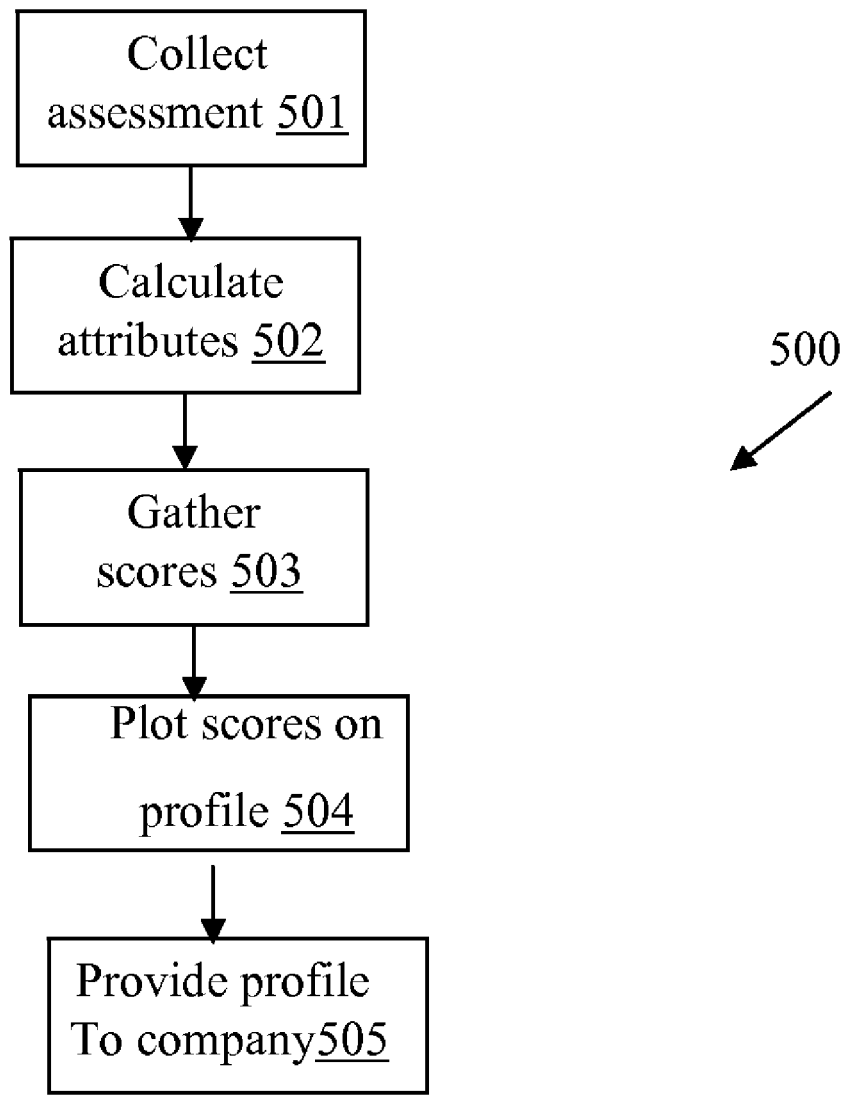
FIG. 13 is a flowchart of an example operation of the candidate module of the framework of FIG. 11.
Figure 14:
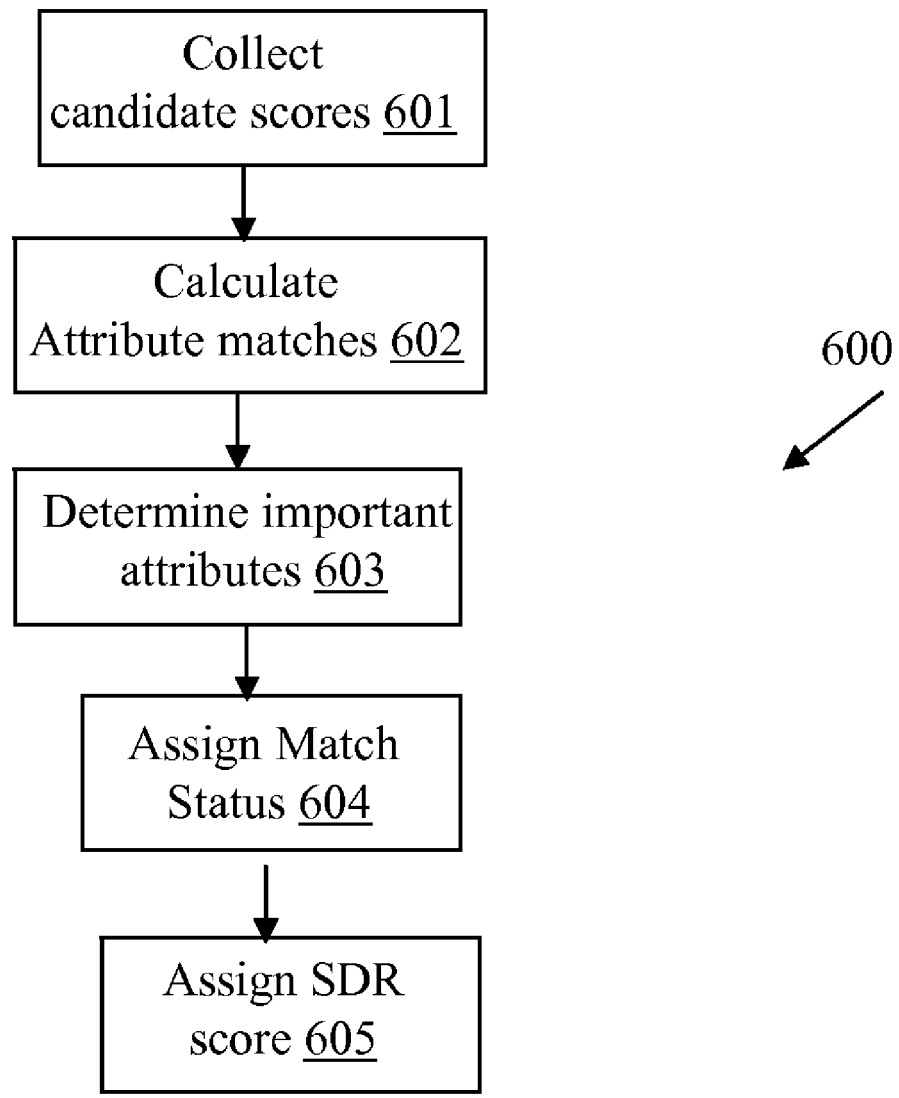
FIG. 14 is a flowchart of an example operation of the matching module of the framework of FIG. 11.

Referring to FIGS. 1, 2 and 12, the following is an example generation process 400 (e.g. of the profile generator module 404—see FIG. 11—using generation rules 121 in the case of implementation on the framework 112) and/or by the profile module 258 in the case where hosted in the customization engine 250.

The process 400 is for customizing the standard employment profile(s) 100 (also referred to as the Benchmark Fingerprint Profile 100) to result in the customized employment profile 107 (also referred to as the Customized Fingerprint 107). At step 401, Select Benchmark Fingerprint, the Benchmark Fingerprint Profile 100 is identified for the target job (e.g. associated with the job definition 102). For example, the Fingerprints 100 are expressed in terms of 17 Worker Attribute values 150, not Core Psychological Attributes that are calculated from the assessments 99, and 3 Work Interest values 150. All values 150 are expressed on a 1-10 numeric scale, for example. The Benchmark Fingerprint Profile 100 provides a Benchmark Value (e.g. range 158) for each of the 20 scales. At step 402, gather responses from Best Employees, the responses from the Assessments 99 are gathered from all present (e.g. selected as Best or mid or weak) Employees (BEs), where Number=N. At step 403, Determine sten scores on Core Psychological Attributes and Work Interest scales, for each BE, derive, based in the individual answers of the assessment 99 for each individual/BE, intermediate scores on (e.g. 15) Core Psychological Attributes 151 (not including Socially Desirable Responding) and the (e.g. 3) Work Interest scales (e.g. interest in things, interest in data, interest in people) on a psychological attribute 151 scale that is similar to the scale 160 of the attributes 150. These intermediate scores are considered each BE's core profile. Further, all the psychological attribute 151 scale scores are organized into a (N×18) matrix (e.g. one row for each BE and one column for each of the 18 core scales, including the 3 Work Interest scales).

At step 404, Derive scores on 18 Worker Attributes, for each BE, a score is computed on each of the 17 Worker Attributes 150. Each computed Worker Attribute 150 score is a predefined combination 256 (e.g. weighted-e.g. linear-combination) of a selected number of the Core Psychological Attribute 151 sten scores calculated at step 403. An example of the predefined combination weights are provided in the attached Translation Matrix 256 (see FIG. 15). For example, "stress tolerance" attribute 150 is calculated as 0.5 times the "resilient" 151 value plus 0.25 times the "tolerates ambiguity" 151 value plus 0.25 times the "self-regulated" 151 value. Further, the weights used to compute Worker Attribute 150 scores can result in Worker Attribute 150 scores that are on the same numeric 1-10 scale as the sten scores for the Core Psychological Attributes 151, for example. From this point forward, all analyses use the computed scores on the 17 Worker Attributes 150 and the original 3 Work Interest sten Attributes 150. These 20 attributes 150 are the basis of the Fingerprint profiles 100, 107, 108. All 20 of the attributes 150 are on a common predefined scale 160 (e.g. 1-10), for example.

At step 405, Compute Average (e.g. mathematical combination) BE Profile, for each of the 20 attributes 150, compute the Average (e.g. mathematical combination) Scale Score achieved by all BEs. These 20 Average (e.g. mathematical combination) Scale Scores form the Average (e.g. representative mathematical combination) BE Profile (which in the case of a candidate 114 would be the individual values 166—see FIG. 2c). Compute the Overall Average (e.g. mathematical combination) of the 20 Average (e.g. mathematical combination) Scale Scores. If the Number of BEs is less than (or equal to) a predefined N minimum employee number threshold 256 (e.g. 4 or lower), for example to promote statistical significance of the impact of the BE scores on the standard profile 100, w(BE)=0.50, the Recomputed Average (e.g. mathematical combination) BE Profile=Average (e.g. mathematical combination) BE Profile, and Go to Step 413.

At step 406, For each BE, correlate Average (e.g. mathematical combination) BE Profile with that BE's profile, for each BE, compute the correlation/homogeneity/relatedness (e.g. in probability theory and statistics, correlation, for example measured as a correlation coefficient, indicates the strength and direction of a linear relationship between two random variables. In general statistical usage, correlation or co-relation refers to the departure of two variables from independence). In this broad sense there are several coefficients, measuring the degree of correlation, adapted to the nature of data—for example on a scale of 0-1.0) between his/her own 20 scale scores and the 20 average (e.g. mathematical combination) scale scores in the Average BE Profile. In step 408 each BE's correlation (e.g. the correlation is an example of a cut-off value 256) is compared to a predefined lower bound 256 of acceptable BE profiles.

At step 407, Compute "d" for each BE, For each BE, compute the average (e.g. mathematical combination) of his/her 20 scales scores, for each BE, compute "d", for example defined as the absolute difference (e.g. mathematical combination) between that BE's average (e.g. mathematical combination) scale score (across all 20 scales) and the Overall Average (e.g. mathematical combination) of the 20 Average (e.g. mathematical combination) Scales Scores in the Average (e.g. mathematical combination) BE Profile. In step 408 each BE's (e.g. "d" is an example of a cutoff value 256) compared to a predefined upper bound threshold 256 of acceptable BE profiles.

At step 408, to promote homogeneity of the attributes values included in the customized profile 107, Remove All "Outlier" BEs, meaning remove all BEs who have the lowest 20% 456 (for example) of all correlations computed in Step 406a. Remove all BEs who have the highest 20% 456 (for example) of all "d" values computed in Step 407. NOTE: the two 20% inclusion thresholds 456 (predefined upper and lower bounds) can be separately adjustable parameters 456. It should be noted that all (i.e. a complete individual) attribute 150 scores associated with a removed individual BE can be deleted (i.e. not included) from the calculation for the customized profile 107. The purpose of the predefined bounds 456 is to remove those scores from calculation of the profile 107 that are associated with the BEs that are deemed least (e.g. not homogeneous) like all other BE scores. In this case, the customization engine 250 has reduced/filtered the number of employees (i.e. their corresponding attribute values) that will be included in the determination of the customized profile 107.

At step 409, Recompute Average (e.g. mathematical combination) BE Profile, Recompute Average (e.g. mathematical combination) BE Profile (see Step 402) based only on all retained Bes. At step 410, Recompute Average (e.g. mathematical combination) BE Profile correlations, where for each retained BE, compute the correlation between his/her 20 scale scores and the 20 Average (e.g. mathematical combination) Scale Scores in the Recomputed Average (e.g. mathematical combination) BE Profile. At step 411, compute average (e.g. mathematical combination) correlations, compute the average (e.g. mathematical combination) of all correlations computed in Step 410a across all retained Bes. At step 412, Compute/Select the weight, "w(BE)" for the Recomputed Average (e.g. mathematical combination) BE Profile, where w(BE)=See attached example Look Up Table (FIG. 16) for Determining w(BE) based on the average (e.g. mathematical combination) retained BE correlation computed in step 411.

At step 413, Compute the weight, "w (Bench)", for the employer's Benchmark Profile, where w(Bench)=1.0−w (BE), for example. At step 414, Compute the Customized Fingerprint Value for each of the 20 scales, for each of the 20 scales of the attributes 150, the Customized Fingerprint Value (i.e. of the customized profile 107) for each attribute 105 is equal to Customized Fingerprint Value=[w(BE)*Recomputed Average Profile Value]+[w(Bench)*Benchmark Value] (e.g. mathematical combination).

At step 415, Apply the 20 Customized Fingerprint values to define the graphical "Target" display, where referring to FIG. 2b, the circular Customized Fingerprint 107 display on the user interface 302 of the company device 101 (as generated by the engine 250 and/or framework 112) includes a "wedge" 152 for each of the 20 Worker Attributes-Work Interests 150. Within each wedge, an arc 156 is drawn some distance from the center point. The full distance of the wedge from the center point of the circle to the outer edge of the circle is 10 units on a 1-10 scale 160, for example, with 10 being the center point and 1 being the out edge for example. For each of the 20 wedges, the Customized Arc 164 is placed at that point equal to the Customized Fingerprint Value computed in Step 414, resulting in the drawing of the identified portion 158 (representing the range in which a candidate 114 calculated attribute is desired by the company 104).

Aggregation Module 260

The aggregation module 260 is configured for determining aggregated customized profiles 109 (i.e. a combination of assessment data 99 for different profiles 107 and/or directly from the collected customization profiles 107 themselves), for use in tracking or otherwise monitoring/comparing any dynamic shifts in general company staff culture/characteristics/attributes. For example, the settings 256 can include minimum company desired attribute 150 values for specified key attributes 150 for different company categories 457, such as but not limited to: a specific job; a specific department being a collection of different jobs; and/or a collection of departments representing a portion or all of the company staff, etc. Further, the settings 456 can also include stored historical aggregate profiles 109 for selected company categories 457 (e.g. an annual profile 107 for a number of years over time determined for the sales department of the company).

Accordingly, upon periodic (either manually triggered and/or automatically triggered such as during annual/semi-annual staff reviews), the aggregation module 260 can determine the current corresponding aggregate profile 109 using the latest available assessment data 99 appropriate for the staff of the selected company category 457. In turn, the aggregate module 260 can compare the currently generated aggregate profile 109 with the corresponding historical aggregate profiles 109 and/or the minimum company desired attribute 150 values for specified key attributes 150. A report of this comparison can be made available to management of the company, in order to facilitate the identification of a rate of change and/or absolute change of staff attributes 150 inside the selected company category 457.

In this manner, the management of the company 104 can monitor the dynamic company culture shifts that invariably occur over time within an organization 104. Further, the company 104 can also use the aggregate profiles 109 as a snapshot of current company staff attributes 150 characteristics for the selected company categories 457, in order to compare the customized profile of a new hire to the company (e.g. a new CEO and/or manager of department), in order to see if the attribute 150 characteristics of the staff correspond (e.g. are compatible with) with the attribute 150 characteristics of the new hire. It is recognised that this is a subtly different application of the customized profiles 107, as the aggregated attributes of staff of the selected company category 457 are being used to evaluate compatibility (e.g. fit) between the staff and the new hire, rather than the comparison between the new hire candidate profile 108 and the customized profile 107 for the employment position associated with the new hire. For example, a match may be provided between the new hire candidate profile 108 and the customized profile 107 for the employment position, however the comparison between the new hire candidate profile 108 and the aggregated profile 109 representing the attributes 150 shared by the staff of the selected company category 457 may denote or otherwise identify some incompatibilities in certain attributes between the new hire and the staff (i.e. an indication of potential lack of fit between the new hire and their department).

Once in the database 110, companies 104 can access the profiles 100,107,108 via a Web portal through a Web search engine provided by the framework 112, i.e. the companies 104 via their browser access the contents of the electronic database 110 over the Internet via the Web portal that hosts the Web search engine. Also provided is the capability to perform periodic updates of the employment definitions 102 and the profiles 107 (e.g. by adding more employee assessments 99) by the company 104.

Framework 112

Referring to FIG. 11, shown is an example of the framework 112 for determining profiles 107, by the company information module 400, the plurality of profiles 108 of the plurality of the candidates 114 for matching against the profiles 107 (e.g. as selected via the job definitions 102 by the candidates 114). It is recognised that the information from the companies 104 and the candidates 114 can come to the framework 112 synchronously and/or asynchronously with respect to communications between the framework 112 and the company 104 candidate sources 114. The profiles 107,108 can be stored in the database 110. Once stored, for example, the profiles 107,108 are accessed, via matching module 408, for determining matching indicators between the company 104 and the candidates 114. A network interface module 402 is used to collect the assessment 99 results of the candidates 114 and the company information module 400 is used to collect company 104 information and employee information 105. A candidate module 406 is used to calculate the profiles 108 and a profile generator module 404 is used to calculate the profiles 107. The framework 112 can also provide a match score, in addition to just plotting their scores 166 on the profile 108, such as; Strong Match, Match, No Match, and/or Distortion (if they intentionally or unintentionally tried to manipulate the assessment 99 test.)

In an alternative embodiment, the framework 112 can implement a scoring system that combines personality with skills and experience. Scores are Strong Fit, Fit, Weak Fit and Distortion, for example. Strong Fit can be derived by the framework 112 matching through a combination of Strong Match and Match (for skills and experience). Fit can be derived through a Match and Match. Weak Fit can be any combination that includes either or both a No Match or No Match. Any result including distortion can be automatically scored a distortion.

Company Module 400

The module 400 is responsible for communicating with the companies 104 over the network 11, in order to receive various employee information 105 and candidate information 114. The information 105 and 114 can be defined using a structured definition language such as but not limited to the Standard Generalized Markup Language (SGML), which defines rules for how a document can be described in terms of its logical structure (headings, paragraphs or idea units, and so forth). SGML is often referred to as a meta-language because SGML provides a "language for how to describe a language." A specific use of SGML is called a document type definition (DTD), which defines exactly what the allowable language is. For example, Hypertext Markup Language (HTML) is an example of a structured definition language for defining the information 105. A further example of the structured definition language is Extensible Markup Language (XML), which defines how to describe a collection of data.

Further, it is recognised that the module could be configured as a Web portal/site for interaction with the companies 104 over the network 11, via a series of structured (e.g. XML) messages between the framework 112 and the company 104 and/or via an interactive series of Web pages, as desired. Further, it is also recognised that the information 105 could be supplied by other communication modes, e.g. email, facsimile, telephone, mail, etc.

The module 400 can also facilitate registration of the companies 104 with the framework 112. The company 104 would provide their registration information, such as name, location, and contact details. The communication of this registration information can include communication modes such as but not limited to: voice communication via phone; written communication via network messaging (e.g. email, facsimile); and/or others as desired. We can also offer promotions and products (ours or other companies') to employers, candidates or employees via email or through their Account page.

It is recognised that the companies 104 registered with the framework 112 could be issued framework ID and password (optional), which uniquely identifies the particular company 104. The framework ID could be associated with the information 105 and the profiles 107 and definitions 102, as well as any matched candidates 114, thus facilitating the receipt of subsequent results information 106 and processing by the framework 112 for storage in the database 110.

The module 400 can include receipt and transmit submodules can be part of the network connection interface module 400.

Network Interface Module 402

The module 402 can be part of the network connection interface 300 (see FIG. 5) of the device 101 operating the framework 112. The module 402 can communicate synchronously or asynchronously with the device 101 of the candidate 114 over the network 11 to receive or otherwise collect the candidate information. For example, the module 402 could be a Web service as a software system designed to support interoperable machine-to-machine interaction over the network 11, between the framework 112 and the candidates 114. The Web service of the framework 112, as facilitated by the module 402 can be configured as a series of Web APIs (and/or Web pages) that can be accessed over the network 11 by the candidates 114 and then executed on the framework 112 hosting the requested services.

The Web service definition can encompass many different systems, such as clients and servers that communicate using XML messages that follow the SOAP standard. Also, the module 402 could provide a machine-readable description of the operations supported by the framework 112 written in the Web Services Description Language (WSDL).

For example, the module 402 provides to the candidates 114 an electronic interface for access to the definitions 102, as searched in the database 110 through any subset of the product details via the search parameters. For example, the electronic interface can be a Web portal offering a structured employment search engine, i.e. the candidates 114 via their browser access the definition 102 contents of the electronic database 110 over the network 11 via the framework 112 that hosts the search engine. For example, the candidates 114 could search jobs offered by selected companies 104 and/or selected job categories in the database 110 to suitable employment opportunities across the country.

Examples of user interface control elements of the interface can include such as but not limited to a dropdown list that is similar to a list box, which allows the candidates 114 to choose one or more values from the list. When the dropdown list is inactive it displays a single value. When activated, the dropdown list displays (drops down) a list of values (e.g. job titles), from which the candidates 114 may select. When the candidates 114 selects a new value the control element reverts to its inactive state, displaying the selected value. The control elements can include, for example, a combo box having an editable entry portion of the list. The navigation field of a web browser is an example of a combo box. A further example of the control elements is a list box or tabs that provide for the selection of one or more jobs/companies at a time by the candidates 114. A further type of example control element is a Pop-up/down menu, whereby pop-ups are used to select a single job/company from a list while pop-downs are used to issue commands (e.g. customized search terms) or in cases where multiple jobs/companies can be selected. In any event, it is recognised that the control elements can be used by the candidates 114 to formulate at least some of the search parameters for suitable employment opportunities defined in the database 110, for example. Further, the module 402 also facilitates the candidates 114 accessing and filling out the assessments 99, as well as selecting which of the companies/jobs they would like their assessment results applied/compared to. Also radio button control elements that allow you to put a dot into a circle to indicate that is your selection. They are frequently used when you are allowed only one choice out of several options. Radio buttons are like checkboxes except that they are mutually exclusive: when one is switched 'on', all others within a grouping are switched 'off'.

The module 402 can include receipt and transmit submodules can be part of the network connection interface module 402. In view of the above, the functionality of the modules 400, 402 can be separate or combined, as desired.

Further, it is recognised that the modules 400, 402, 404, 406, 408 can be configured to operate interactively as shown, the operations/functionality of the selected modules 400, 402, 404, 406, 408 can be combined or the operations/functionality of the selected modules 400, 402, 404, 406, 408 can be further subdivided, as desired. Further, it is recognised that the modules 400, 402, 404, 406, 408 can communicate or otherwise obtain their calculated results from one another (and/or to the candidates 114/companies 104 over the network 11) or can store their respective calculated results in the storage 110 for subsequent retrieval by another module 400, 402, 404, 406, 408 there-from.

Computing Devices 101

Figure 5:
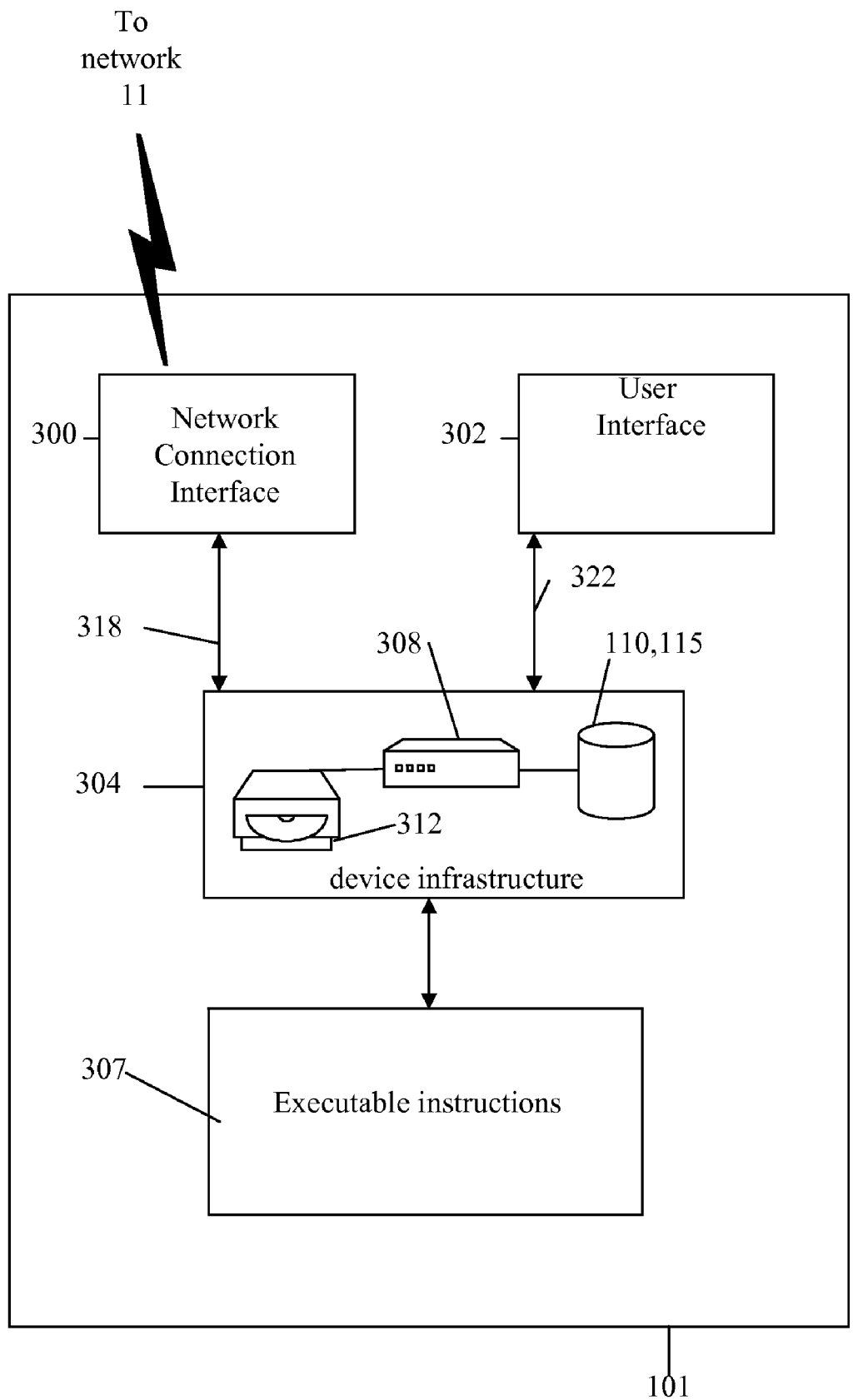
FIG. 5 is a block diagram of an example computing device for implementing the components of the environment of FIG. 1.

Referring to FIGS. 1 and 5, each of the above-described components of the environment 10, i.e. the company 104, the framework 112, the customization engine 250, the candidates 114 and the employees can be implemented on one or more respective computing device(s) 101. The devices 101 in general can include a network connection interface 300, such as a network interface card or a modem, coupled via connection 318 to a device infrastructure 304. The connection interface 300 is connectable during operation of the devices 101 to the network 11 (e.g. an intranet and/or an extranet such as the Internet), which enables the devices 101 to communicate with each other as appropriate. The network 11 can support the communication of the employee information 105 and corresponding results 106 (that can include employee and/or candidate results) between the framework 112 and the company 104, as well as between the candidates 114 and employees 105 and the framework 112 for on-line completion of the individual assessments 99 and 98, and between the framework 112 and the engine 250 and between the engine 250 and the company 104 and/or employees directly.

Referring again to FIG. 5, the devices 101 can also have a user interface 302, coupled to the device infrastructure 304 by connection 322, to interact with a user (e.g. candidate 114, company 104 human resources coordinator, framework 112/engine 250 administrator, etc.). For example, the company 104 to view and interact with the electronic interface supplied by the interface module 202 uses the user interface 302 of the device 101. The user interface 302 can include one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the device infrastructure 304. For example, the user interface 302 for the devices 101 used by the company 104 can be configured to interact with a web browser (e.g. applications 307) to collect the information 105 as well as process the received results 106 (e.g. review the various details of the candidates and employees in reports). For the devices 101 used by the framework 112, the user interfaces 302 can be used by a framework 112 administrator to monitor (e.g. manually or automated through software—e.g. applications 307) the registration of the companies 104 and performance of the matching between candidates and employment profiles 107 and performance of generation of the profiles 107 and any desired reports by the company 104. It is also recognised that the candidates 114 and employees can complete paper-based assessments 99 too, for data entry as digital data 99 for use by the customization engine 250.

Referring again to FIG. 5, operation of the devices 101 is facilitated by the device infrastructure 304. The device infrastructure 304 includes one or more computer processors 308 and can include an associated memory 110,115 (e.g. a random access memory). The computer processor 308 facilitates performance of the device 101 configured for the intended task through operation of the network interface 300, the user interface 302 and other application programs/hardware 307 of the device 101 by executing task related instructions. These task related instructions can be provided by an operating system, and/or software applications 307 located in the memory 110, and/or by operability that is configured into the electronic/digital circuitry of the processor(s) 308 designed to perform the specific task(s).

Further, it is recognized that the device infrastructure 304 can include a computer readable storage medium 312 coupled to the processor 308 for providing instructions to the processor 308 and/or to load/update client applications 307. The computer readable medium 312 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 110. It should be noted that the above listed example computer readable mediums 312 can be used either alone or in combination. The device memory 110 and/or computer readable medium 312 can be used to store the registration information of the companies 104 and the results of the individual assessments 99 as completed. Further, the device memory 110 can also be used by the framework 112 as a means to store and access profiles 107 for use in matching with the scores of the candidates 114 (i.e. to determine which candidates 114 should be indicated as a potential interviewee for the company 104).

Further, it is recognized that the computing devices 101 can include the executable applications 307 comprising code or machine readable instructions for implementing predetermined functions/operations including those of an operating system, a web browser, the framework 112 for example. The processor 308 as used herein is a configured device and/or set of machine-readable instructions for performing operations as described by example above. As used herein, the processor 308 may comprise any one or combination of, hardware, firmware, and/or software. The processor 308 acts upon information by manipulating, analyzing, modifying, converting or transmitting information for use by an executable procedure or an information device, and/or by routing the information with respect to an output device.

The processor 308 may use or comprise the capabilities of a controller or microprocessor, for example. Accordingly, any of the functionality of the framework 112 (e.g. modules 400, 402, 404, 406, 408, and subset thereof) may be implemented in hardware, software or a combination of both. Accordingly, the use of a processor 308 as a device and/or as a set of machine-readable instructions is hereafter referred to generically as a processor/module for sake of simplicity. Further, it is recognised that the framework 112 can include one or more of the computing devices 101 (comprising hardware and/or software) for implementing the modules 400, 402, 404, 406, 408, or functionality subset thereof, as desired.

It will be understood that the computing devices 101 of the consumers 104 may be, for example, personal computers, personal digital assistants, mobile phones. Server computing devices 101 can be configured for the framework 112 and the companies 104 as desired. Further, it is recognised that each server computing device 101, although depicted as a single computer system, may be implemented as a network of computer processors, as desired.

Algorithm for Generating the Candidate Profile 108

Referring to FIGS. 1, 2, 3 and 13, the following is an example generation process 500 by the candidate profile generation module 406 (see FIG. 11), using generation rules 122, for customizing the candidate profile 108 (based on the calculated customized profile 107) using the computed candidate attributes 150.

At step 501, Candidate 114 completes assessment, the candidate 114 accesses the network interface module 402 of the framework 112 and completes the personal assessment 99. The candidate can also select which job definitions 102 their assessment results should be applied to (i.e. plotted on the customized profile 107 associated with the job definition 102). Conversely, the employer 104 may search database 110 for candidates 108 who may match their job profiles 107 or job definitions 102.

At step 502, Calculate candidate attribute 150 values, the candidate module 406 subsequently calculates (by following steps similar to steps 403 and 404 of the process 400) the attribute 150 values for the candidate 114, based on the assessment 99 and 98 results collected by the network interface module 402.

At step 503, Gather the Candidate's 20 Scores for each selected definition 102, for the candidate 114 to be plotted onto the customized Fingerprint 107, for example for each of the job profiles 102 selected) gather all 17 computed Worker Attribute 150 scores and all 3 original Work Interest 150 sten scores for the candidate's 114 calculated core attributes 151, which were derived from the completed personal assessment 99 and 98 of the candidate 114. Each of these 20 scores is on a 1-10 numeric scale.

At step 504, Place a symbol 166 (e.g. a numbered dot) for the candidate 144 in each wedge for each candidate profile 108 calculated, referring to FIG. 3, the circular Customized Fingerprint display includes 20 "wedges", one for each of the 20 Worker Attributes and Work Interests 150. The full distance of the wedge from the center point of the circle to the outer edge of the circle is 10 units on a 1-10 scale, with 10 being the center point and 1 being the out edge. For each of the 20 wedges, a point/symbol 166 representing the candidate's score is placed along the imaginary center-line (for example) of the wedge at a point equal to the candidate's score on that attribute scale 160. For example, a score of 10.0 on, say, Recovers from Setbacks, would place the candidate's symbol right on the center point at the inner tip of the wedge (i.e. upper boundary 164) associated with Recovers from Setbacks. A score of 1.0 would place the candidate symbol 166 on the outer edge of the circle at the center of the arc defining that wedge (i.e. at the lower boundary 164). A score of 9.0 would place the candidate's 114 symbol 166 one unit away from the center point (i.e. upper boundary 164), along the wedge's center line, toward the outer edge, for example. And so on. Same process for employee profiles.

At step 505, Provide candidate profile to company, it is recognized that at this stage, the determined candidate profile 108 can be made available to the company 104, if desired (for example based on the matching results described below). The company 104 can elect to pay for the candidate profiles 108 desired, based on a graduated cost scale (e.g. the company 104 can pay on a profile 108 by profile 108 basis, can buy a set number of profiles 108, and/or can buy a subscription for an unlimited number of profiles 108 for all job definitions 102 or on a definition 102 by definition 102 basis), as part of the results information 106.

Algorithm for Matching the Candidate Profile 108 to Ranges

Referring to FIGS. 1, 2, 3, 11 and 14, the following is an example matching process 600 by the matching module 406 (see FIG. 11), using matching rules 123, for determining if the candidate profile 108 matches thresholds (e.g. matching attribute ranges 158 of all or selected represented in the profile 108, a framework score that identifies the number of/percentage of customized profiles 107—associated with job definitions 102—that the candidate 114 has matched via their calculated attribute scores 150 for all or a selected grouping of customized profiles 107 in the database 110, and/or job definition 102 criteria such as academic qualifications, work experience, selected skills/capabilities, etc.) using the computed candidate attributes 150 and any other candidate information supplied by the candidate 114 that is not part of the computed candidate attributes 150 (e.g. resume details such as grade point average, specific academic qualifications, languages spoken, personal interests/hobbies, etc.) For example, the match formula for these criteria might be structures as an all or nothing. One example is the idea is minimum criteria, so it acts like a threshold that must be met or exceeded.

It is recognised that the ranges 152 (see FIG. 3) extend from the first boundary 154 (e.g. an outside circle) to the second boundary 156 (e.g. an inner circle), such that the identified/target portion 158 in each range 152 represents a region that a candidate's 114 score 166 (for that attribute 150) should fall into, in order to be potentially considered for the job(s) 102 associated with the profile 107,108.

At step 601, Gather the Candidate's 20 scores, for the candidate to be "matched" against a customized Fingerprint, gather all 17 computed Worker Attribute scores and all 3 original Work Interest sten scores. Each of these 20 scores 166 is on a 1-10 numeric scale. For each of the 20 attribute scales 160, record the Customized Fingerprint Value that defines the location of the Fingerprint arc(s) 164 for that particular attribute. (These Customized Fingerprint Values were computed in Step 414a of the algorithm 400 to combine Best Employee profiles with Benchmark Fingerprints.).

At step 602, Define and Count "Hits", "Misses" and "Big Misses", For each of the 20 attributes 150, determine whether the Candidate's score 166 is classified as a "Hit", "Miss", or "Big Miss" according to the following example rules:

A score is classified as a "HIT" if it is equal to or higher than the Customized Fingerprint Value (or is otherwise inside of the bounds 164 of the portion/target 158) for that attribute 150

A score is classified as a "MISS" if it is not more than 2.5 points lower/outside than the Customized Fingerprint Value/portion.

A score is classified as a "BIG MISS" if it is more than 2.5 points lower/outside than the Customized Fingerprint Value/portion.

Note, the value of 2.5 is a variable parameter that can be adjusted.

At step 603, Define 5 Most Important Attributes, among the 20 attributes, identify the 5 (for example) with the highest Customized Fingerprint Values. These are the 5 Most Important Attributes, for example. It is recognized that this determination could be done at the process 400 stage, as desired. For example, this attribute type (e.g. top or otherwise better that other less desired attributes) is most likely the smallest target areas, the most difficult to hit, therefore the attributes most predictive of job success and therefore deemed desirable by the company. Count the number of "Hits" among the 5 Most Important Attributes.

At step 604, Assign the candidate a "Match" status or a plurality of Match statuses, Assign the candidate a status of "Strong.Match" if all the following conditions apply, for example:
  16 or more Hits among the 20 attributes
  no Big Misses among the 20 attributes
  4 or more Hits among the 5 Most Important Attributes
assign the candidate a status of "Match" if all the following conditions apply:
  Candidate is not a "Strong Match"
  At least 14 Hits among the 20 attributes
  no more than 2 Big Misses among the 20 attributes
  3 or more Hits among the 5 Most Important Attributes
Otherwise, assign a status of "No Match"
Note, all critical values for Hits, ie 16 and 14, the critical values among Most Important Attributes, ie 4 and 3, and the critical value for Big Misses, i.e. 21, could be variable parameters than can be adjusted.

Further, it is recognized that varying degrees of matching of the candidate 114 to the employment definition 102 (or otherwise to the company 104 generically) can be calculated based on the other employment criteria/information (e.g. other than the target ranges 158 of the attributes 150) given by the company 104 as described above, matching to employment criteria such as but not limited to academic qualifications, work experience, interests/hobbies, specified skill/qualifications, etc. For example, matching information supplied by the candidate 114 (e.g. via the Web pages of the network module 402 and/or a resume) with the other employment criteria/information can be done by keyword matching or other matching techniques as apparent to a person skilled in the art.

Accordingly, in view of the above, it is apparent that the candidate 114 can be matched to a variety of different matching criteria. One match indicator can be the degree (e.g. as simple as match or no match) between the candidate attribute 150 scores and the target ranges 158 of the employment profile 107. Another match indicator can be part of the overall attribute 150 matching or separate as to the number of critical/more important attributes 150 (e.g. top 5 out of the 20) as identifies by the company 104 that the candidate scores within the target range 158 of those critical/more important attributes 150. A further match indicator is the framework score of the ranking of the candidate's attribute 150 score matching with a plurality of different customized profiles 107 for a plurality of different companies 104 or at least for a defined subset of the plurality of different customized profiles 107 available in the database 110. For example, this framework score can be calculated as a percentage and/or total number of profiles 107 that the candidate's attributes 150 matched (as described above).

At step 605, Assign the candidate a "Flag" status based on his/her "Socially Desirable Responding" or "distorted" score, Separate from the "Match" status, assign the candidate a status of "Flag" or "No Flag" based on his/her score on the Socially Desirable Responding (SDR) scale. This score is an original sten score and is may not be a combination of any other attributes 150.

"Flag" status is assigned if the candidate's SDR score is equal to or higher than 9.0 or equal to or lower than 2.0, as example SDR thresholds.

"No Flag" status is assigned otherwise. (i.e. the SDR score is lower than 9.0 and higher than 2.0).

A score for "distortion" or "distorted" score may be comprised of social desirability and may or may not include a consistency measure, re: how applicants are responding to the questions in a consistent manner, or one that indicates they may not be answering in an honest or frank manner.

At step 606, Provide match status(es) of the candidate 114 to the company 104, the determined match status(es) can be provided to the company 104 via the company info module 400 and/or the matching module 408, for example, as candidate information that can be paid for/purchased by the company 104 as described above with reference to the candidates profile 108, as desired, as part of the results information 106.

In any event, in view of the above described match indicators, it is recognised that only a portion of the degree of match of a candidate 114 with the company 104 (e.g. job profile 102) may be provided to the company 104 as a first stage (see attached example screen shots of the Web pages) evaluation of the candidate 114. An example of the first stage is such as but not limited to: a profile 107 match indicator (e.g. strong match, match, no match, strong mismatch) without further details of the candidates profile 108; some details of the profile match 107 (e.g. the number of and/or which of the critical/top attributes were matched/missed); match indicators on the employment criteria not being the attribute 105 scores (e.g. rating on the degree of match to qualifications, skills, abilities, etc.); and/or the framework score as discussed above as a representative score of the desirability of the candidate 114 as considered by other companies 104, for example; or a combination thereof. Based on the first stage, the company 104 can decide to purchase or otherwise be provided with second or subsequent stage results 106, such as detailed candidate reports including the candidate profile 108 that shows all of the attribute scores of the candidate 114 and/or the candidate resume or other information submitted to the framework 112 by the candidate 114.

The framework score can be based on current active customized profiles 107 in the database 110 and/or on all inactive (e.g. historical) and active profiles 107, as desired, such that active means that there is an employment position that remains unfilled with the company 104 and inactive means that the profile 107 was used to already match a candidate 114 to the company 104 that resulted in a filled company 104 employment position. Further, the match scores can be dynamic as well, since they can change as the customized profiles 107 are updated with the addition/subtraction of assessment data 99 (e.g. as submitted/selected by the employer 104). This can mean that a dynamic shift in the profile 107 can force a rescore of all current candidates against the job represented by the profile 107 using the matching criteria. Someone could be a match one day and no match the next without changing their respective original assessment data 99. Accordingly, the use of dynamic changing match scores (in view of dynamically changing assessment data 99 input to the customization engine 250 over time by the employer 104) can result in previously selected employees as suitable for a position become unsuitable for the same position, in light of the subsequently reassessed match between their original data 99 and the newly revised profile 107.

For example, a revised profile 107 can be used to determine if a present manager/C-level member of the company is now no longer suitable to the needs of the company 104, as indicated by the match/mismatch of the present manager's/C-level member's original assessment data 99 with the revised profile 107. It is also recognised that the revised profile 107 can also be a revised aggregate profile 109 determined by the aggregation module.

Employers 104 are able to match people regardless of whether they are looking to fill a vacant position or not. In addition, employers can purchase reports on employees 105, but the employee reports may not include the benchmark 107 or 102 or 100—only the scores 166 of that employee 105 on the profile 102/107.

Further, it is recognised that the matching module 208 can generate the format of the results 106 (e.g. match indicators and/or profile 108) as display data suitable for use in subsequent rendering of the candidate results 106 on a display (e.g. user interface 302 of the consumer device 101—see FIG. 5).

SUMMARY

The following are example summary features of the above-described environment 10. "Turnkey/self-serve": Customization can be done online, without expert intervention. "Customizing": Each employer gets their own unique job profile, because each job profile incorporates the scores of their own top performers and occasionally mid and bottom performers (which are unique to only them, obviously). "Balance": Each employer starts with a (i) standard job profile, customizing it by (ii) adding the profiles of their own top, mid, or bottom performers. Our system puts more weight on the (i) standard job profile if there are fewer (ii) top, mid, or bottom employees or less weight on the (i) standard job profile if there are several (ii) top, mid, or bottom employees.

Further features can include, for example: 1) Our 20 unique Worker Attributes are built from a matrix that's based on standard Core Attributes ("Big 5"); 2) 20 Worker Attributes are represented using a "target" shape, with 20 "wedges"—one for each attribute; 3) Adding best employees to the Industry Standard JobFingerprint (ISJF) in different ways: (a) if 1-4 employees added, average all employees together and weighting is 50/50 with ISJF or (b) if 5+ employees added, remove individuals with (i) bottom 20% of correlation with average of all employee scores or (ii) bottom 20% of variance from average of all employee scores. (Each elimination category may contain the same individual); 4) Employees' scores are not shown when employer is adding them to their ISJF, per above process; 5) Weighting between ISJF and best employees depends on how many best employees are included in the JobFingerprint: more employees means more weighting on employees, while fewer employees means more weighting on ISJF (e.g. derivation of homogeneity of the employee assessment data 99 can be a function of uniqueness of responses—difference between their top (e.g. 5) traits and bottom (e.g. 5) traits and correlation between the employees; 6) "Blind" employer process of getting candidate results. Candidates may or may not be anonymous (no identifiable info before gaining their permission): (a) Review mini "teaser" match result that includes (i) match-type rating, (ii) A+-type rating in 4 criteria (e.g. work/academic qualifications/skills) and (iii) framework Score. (b) If they have not already, gain candidate's permission (via standardized internal program message to candidate's framework 112 inbox) before being able to view a report on them (that includes their personally-identifiable information). (c) If permission is granted, employer can choose to pay money (e.g. financial compensation to the framework 112) to see a candidate's report, with more extensive information than simple the "teaser" ratings and framework Score, as described above; and 7) "framework Score", per candidate, based on number of overall employer searches (active and inactive jobs) that this candidate has matched. These are searches from any employer, so this is like an overall "popularity rating" for that candidate. We may or may not refine this rating to be industry specific, so the score does not favour "general" candidates so much.

Further, the "framework" aka "Careerious Score" can be based on employer 104 activity around a particular candidate 114 or employee 105, such as how many times that candidate 114 or employee 105 matches employer 104 searches of the database 110 or how many employers have profiles 107 that match that candidate 114 or employee 105. In this way the framework score can be considered as a way the framework 112 can recommend candidates 114 to companies 104, based on what other companies 104 thought of that candidate (e.g. if the candidate matched other particular attributes, other information 98, and/or complete profiles 107). The framework 112 may use this framework score to create a marketplace for candidates across industries. The following is an example of calculating the framework score, where the formula or calculating said score may change from time to time: Careerious Score=25

A candidate's 114 or employee's 105 Careerious Score increases each time a candidate 114 or employee 105 are awarded Careerious Match Points. For example, all candidates may start with 25 Points and additional Careerious Match Points are awarded/deducted for what may resemble the following:

| | |
|---|---|
| 1 Point | Candidate's profile 114 matches 1 employer 104 search. |
| 3 Points | 1 employer 107 orders a Candidate Hiring Report on candidate. |
| Erase all Points | 1 employer (who orders a Candidate Hiring Report) rates candidate's information as inaccurate. |
| Permanent Score of zero (0) | 2 employers (who order a Candidate Hiring Report) rate candidate's information as inaccurate. |

Each employer may only score 1 match per employer job profile 102, 107, 100, to avoid employers abusing the system by running-up their friends' Careerious Score for them. In other words, if an employer has 3 job profiles, the highest score they can give any one candidate is 3 matches (3 points), for example. 3 Points for a Hiring Report can only be scored once per employer, per candidate. In other words, an employer can only award a candidate 3 Hiring Report points ONCE.

Accordingly, in view of the above example framework score determination, it is recognised that the framework score can be based on a plurality of different match results of the candidate, including the desired as well as determined quality of the match results 106. Further, it is noted that the framework score can be based on information obtained about the candidate from not only the company 104 but from other companies 104 as well via their experiences with the candidate and their profiles 107. It is recognised that any of the above-provided parameter values are given by example only for the various numbers.

EXAMPLE OPERATION OF THE CUSTOMIZATION ENGINE 250

Figure 17:
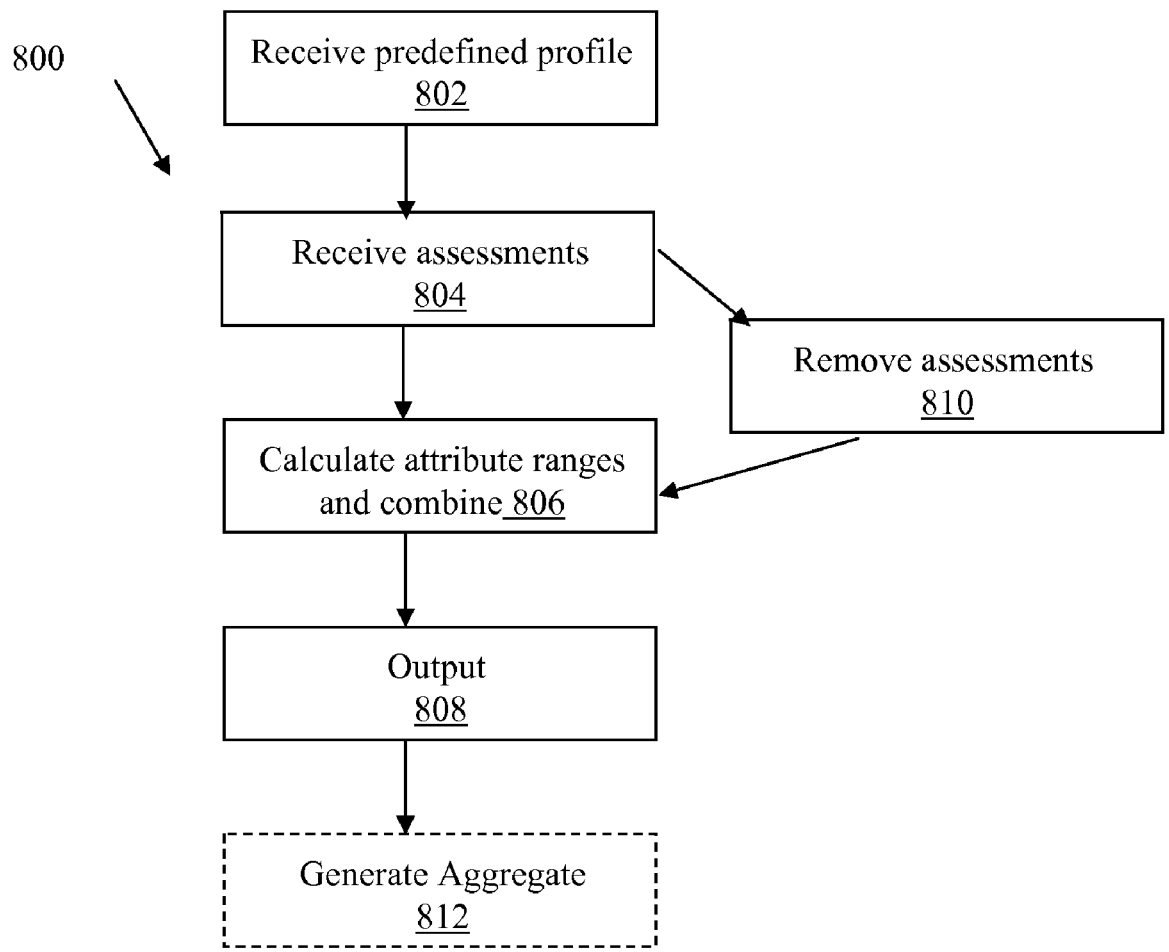
FIG. 17 shows a flowchart of an example operation of the customization engine of FIG. 3.

Referring to FIG. 17, example operation 800 of the customization engine 250 is shown for dynamically generating a customized profile 107 for a company 104 for a selected profile type, the customized profile 107 including a set of attribute 150 types, each of the attribute types having a customized attribute range 152.

At step 802, a receipt module 252 receives a predefined profile 100 corresponding to the selected profile type, the predefined profile 100 having predefined attribute 150 types corresponding to the set of attribute types, each of the predefined attribute types having a predefined attribute range 152 representing a range of attribute values for the selected profile type.

At step 804, the receipt module 252 receives a plurality of personal assessments 99 of individuals (e.g. employees, past/present/future) related to the company 104, each of the personal assessments 99 having questions related to one or more attributes 150 of the set of attribute types, each of the questions having a value assigned by the respective related individual.

At step 806, a profile module 258 calculates determined attribute ranges 152 for each of the attribute types of the set of attribute types based on the values of the questions, and generates the customized attribute ranges 152 as a combination of the determined attribute ranges 152 with the predefined attribute ranges 152.

At step 808, an output module 264 stores or otherwise outputs the generated customized ranges 152 as the customized profile 107.

Optionally, at step 810, the profile module 258 selects personal assessments 99 corresponding to one or more of the related individuals and removes the corresponding attribute values from the combination prior to generating the customized profile 107.

Optionally, at step 812, an aggregator module 260 combines two or more of the plurality of customized profiles 107 to generate an aggregated customized profile 109. At step 812, the aggregator module 260 compares at least one of a plurality of aggregated customized profiles 109 with one another 109 or a selected customized profile 107 with one or more aggregated profiles 109, the comparison for identifying a dynamic shift in time in general company staff values associated with the personal assessments.

EXAMPLE RAW SCORE CONVERSION PROCESS

Converting Raw Scores on Core Personality Attributes and Work Interest to "Sten-Like" 1-10 Scales The Problem To put scales scores on a sten scale, CareerXact's scoring methodology must convert raw scores (I don't know the formula for producing raw scores) into sten scores by applying a normative percentile rank distribution of raw scores to create sten scores. Each sten score is defined as the score achieved by a certain percentage of respondents. For example, 10 is defined as the score achieved by the top 3%, approximately. All these percentages are shown here for the sten scale

| Sten Score | Percentage of Respondents |
|---|---|
| 10 | 3% |
| 9 | 4% |
| 8 | 9% |
| 7 | 15% |
| 6 | 19% |
| 5 | 19% |
| 4 | 15% |
| 3 | 9% |
| 2 | 4% |
| 1 | 3% |

For the new Careerious scales, in cases where one doesn't yet have any normative data so we don't know what raw scores are achieved by, say, 3% of the respondents to know what raw scores should be assigned a sten score of 10.

Interim Solution

One interim solution until we have accumulated enough Careerious data to have stable estimates of the percentile rank distributions of raw scores on each attribute (ie all 16 core psychological attributes and 3 Work Interests), we cannot convert the Careerious raw scores into true sten scores for any attribute. However, we can transform the raw scores on each attribute into a 1-10 scale such that the highest possible transformed score is 10 and the lowest is 1

Proposed Transformations for Converting Careerious Raw Scores to 1-10 Scale Scores Different transformations are used for (a) the Socially Desirable Responding scale, (b) the other 15 core personality scales, and (c) the 3 Work Interest scales. This is because there are different numbers of items in these three groups of scales—there are 10 items in the Soc Des Responding scale, 6 items each in the 15 core personality scales, and 12 items each in the 3 Work Interest scales. The number of items directly impacts the maximum and minimum possible raw score values.

Step 1. Compute Raw Score. The process of transforming raw scores into 1-10 scales scores begins in the same way for all 19 attributes for each person. The first step is to compute that person's raw scores on all 19 attributes. (NOTE: for any particular attribute, a person's raw score is simply the sum of assigned score points for his/her chosen responses across all the items that comprise that attribute. Remember, for the core personality attributes and the Soc Des Responding scale, the assigned score points must take into account the sign of the item. This is not the case for the Work Interest items because they are all, in effect, positively signed items.) For the 16 core personality attributes, including Soc Des Responding, the response scale is −3, −1, +1, and +3. That means for the core personality attributes that use 6 items, the maximum raw score is +18 (if the person choose the most "highest" response for all 6 items, s/he would accumulate +18 raw score points; +3 points for each of the 6 items.). The minimum raw score is −18. Similarly, for the 10-item Soc Des Responding attribute, the maximum raw score is +30 and the minimum raw score is −30. For the 3 Work Interest scales, we have not confirmed a response scale. However, the −3, −1, +1, and +3 response scale would work just as well for the Work Interests as it does for the core personality attributes so this transformation process will assume that the same response scale is used for all Careerious raw scores scales. In that case, the maximum possible raw score on a Work Interest scale is +36; the minimum possible score is −36. All of these scales must be transformed to scales that have a maximum value of 10 and a minimum value of 1. These example transformations are shown below, 15 Core Personality Scales (6 items) (Changed from the original process)

Transformed Score=See table-look-up in "Revised Core Psychological Attribute Scoring Process" table below.

Socially Desirable Responding Scale (10 items) (No change from the original process)

Transformed Score=[[Raw Score×3]/20]+5.50

Work Interest Scales (12 Items) (No change from the original process)

Transformed Score={Raw Score/8.00]+5.50

Revised Core Psychological Attribute Scoring Process Table

| Raw Score | Current Scoring Rule [Raw/4 + 5.5] | New Rule 1 | New Rule 2 |
|---|---|---|---|
| 18 | 10.00 | 10.0 | |
| 17 | 9.75 | 10.0 | |
| 16 | 9.50 | 10.0 | |
| 15 | 9.25 | 9.8 | |
| 14 | 9.00 | 9.6 | |
| 13 | 8.75 | 9.4 | |
| 12 | 9.50 | 9.2 | |
| 11 | 8.25 | 8.7 | |
| 10 | 8.00 | 8.3 | |
| 9 | 7.75 | 7.7 | |
| 8 | 7.50 | 7.3 | |
| 7 | 7.25 | 6.8 | |
| 6 | 7.00 | 6.5 | |
| 5 | 6.75 | 6.2 | |
| 4 | 6.50 | 5.7 | |
| 3 | 6.25 | 5.3 | |
| 2 | 6.00 | 4.7 | |
| 1 | 5.75 | 4.3 | |
| 0 | 5.50 | 3.8 | |
| −1 | 5.25 | 3.5 | |
| −2 | 5.00 | 3.2 | |
| −3 | 4.75 | 2.8 | |
| −4 | 4.50 | 2.5 | |
| −5 | 4.25 | 2.2 | |
| −6 | 4.00 | 1.8 | |
| −7 | 3.75 | 1.8 | |
| −8 | 3.50 | 1.8 | |
| −9 | 3.25 | 1.5 | |
| −10 | 3.00 | 1.5 | |
| −11 | 2.75 | 1.5 | |
| −12 | 2.50 | 1.2 | |
| −13 | 2.25 | 1.2 | |
| −14 | 2.00 | 1.2 | |
| −15 | 1.75 | 1.0 | |
| −16 | 1.50 | 1.0 | |
| −17 | 1.25 | 1.0 | |
| −18 | 1.00 | 1.0 | |

We claim:

1. A system for dynamically generating a customized profile for a company for a selected profile type, the customized profile including a set of attribute types, each of the attribute types having a customized attribute range, the system comprising: a receipt module for receiving a standard profile corresponding to the selected profile type, the standard profile having standard attribute types corresponding to the set of attribute types, each of the standard attribute types having a standard attribute range representing a standard range of attribute values for the selected profile type, such that each of the standard range of attribute values of the standard profile is based on industry wide employee profiles representing an industry benchmark for a plurality of companies, and for receiving a plurality of personal assessments of individuals related to the company, each of the personal assessments having questions related to one or more attributes of the set of attribute types, each of the questions having a value assigned by the respective related individual; a profile module for calculating determined attribute ranges for each of the standard attribute types of the set of attribute types based on the values of the questions, the determined attribute ranges corresponding to the standard attribute types, and for generating customized attribute ranges by combining the determined attribute ranges with the standard attribute ranges; and an output module adapted for storing the generated customized ranges as the customized profile.

2. The system of claim 1, wherein the weighted combination is based on a number of related individuals of the company represented in the plurality of personal assessments, such that the profile uses the actual number of related individuals represented in the plurality of personal assessments or a reduced or otherwise revised number of related individuals based on comparison of the number of related individuals to a determined inclusion number threshold.

3. The system of claim 2, further comprising a plurality of filter settings for use by the profile module in affecting the combination of the determined attribute ranges with the predefined attribute ranges.

4. The system of claim 3, wherein the plurality of filter settings is selected from the group comprising: a weighted combination based on minimum number of the related individuals providing the plurality of personal assessments; an indication of one or more of the related individuals to include in the combination; an indication of one or more of the related individuals to exclude in the combination; and an indication of a performance rating assigned to one or more of the related individuals for use in either excluding or including the respective related individual in the combination.

5. The system of claim 4, wherein the indication is assigned by the company to the one or more related individuals.

6. The system of claim 5, wherein the related individuals are current or past employees of the company and the predefined attribute range represents the range of attribute values for individuals outside of the company.

7. The system of claim 1, wherein the selected profile type is selected from the group comprising: a defined employment position; and a representative employment position as a combination of defined employment definitions.

8. The system of claim 7, wherein the representative employment position is a company department or grouping of company departments.

9. The system of claim 1 further comprising the profile module adapted for selecting personal assessments corresponding to one or more of the related individuals and removing the corresponding attribute values from the combination.

10. The system of claim 9, wherein the removal is based on the selected one or more related individuals considered as outside of a representative value of the determined attribute ranges.

11. The system of claim 10, wherein the representative value is an average.

12. The system of claim 1, wherein the customized profile is one of a plurality of customized profiles stored in a memory.

13. The system of claim 12, further comprising an aggregator module adapted for combining two or more of the plurality of customized profiles to generate an aggregated customized profile.

14. The system of claim 13, wherein the aggregator module is adapted for comparing at least one of a plurality of aggregated customized profiles with one another or a selected customized profile with one or more aggregated profiles, the comparison for identifying a dynamic shift in time in general company staff values associated with the personal assessments.

15. The system of claim 14, wherein the comparison includes historical aggregate customized profiles or a minimum company desired attribute value for specified key attribute.

16. The system of claim 14, wherein the aggregator module is operated periodically for facilitating monitoring the dynamic shift in time in general company staff values associated with the personal assessments.

17. The system of claim 1, wherein the customized profile has an arcuate shape and a plurality of wedges distributed around a central region of the arcuate shape, such that each of the plurality of wedges represents one of the predefined attribute ranges.

18. The system of claim 17, wherein each of the predefined attribute ranges extends from an inner boundary to an outer boundary in the respective wedge, such that the inner boundary is distanced from the central region towards a periphery of the arcuate shape and the outer boundary is distanced from the periphery of the arcuate shape towards the central region.

19. The system of claim 18, wherein the arcuate shape is a circle.

20. The system of claim 1, wherein said combining the determined attribute ranges with the standard attribute ranges uses a weighted combination of the determined attribute ranges and the standard attribute ranges.

21. The system of claim 20, wherein the weighted combination includes an unequal weighting between the determined attribute ranges and the standard attribute ranges.

22. A method for dynamically generating a customized profile for a company for a selected profile type, the customized profile including a set of attribute types, each of the attribute types having a customized attribute range, the method comprising instructions stored on a memory and executable by a computer processor, the instructions comprising: receiving a standard profile corresponding to the selected profile type, the standard profile having standard attribute types corresponding to the set of attribute types, each of the standard attribute types having a standard attribute range representing a standard range of attribute values for the selected profile type, such that each of the standard range of attribute values of the standard profile is based on industry wide employee profiles representing an industry benchmark for a plurality of companies; receiving a plurality of personal assessments of individuals related to the company, each of the personal assessments having questions related to one or more attributes of the set of attribute types, each of the questions having a value assigned by the respective related individual; calculating, using the computer processor, determined attribute ranges for each of the standard attribute types of the set of attribute types based on the values of the questions, the determined attribute ranges corresponding to the standard attribute types; generating, using the computer processor, customized attribute ranges by combining the determined attribute ranges with the standard attribute ranges; and storing the generated customized ranges as the customized profile.

23. The method of claim 22, wherein said combining the determined attribute ranges with the standard attribute ranges uses a weighted combination of the determined attribute ranges and the standard attribute ranges.

24. The method of claim 23, wherein the weighted combination includes an unequal weighting between the determined attribute ranges and the standard attribute ranges.

25. The method of claim 23, wherein the weighted combination is determined based only on the determined attribute ranges obtained from the values of the questions.

* * * * *